United States Patent
Park et al.

(10) Patent No.: US 9,905,884 B2
(45) Date of Patent: Feb. 27, 2018

(54) ELECTROLYTE FOR SECONDARY BATTERY AND SECONDARY BATTERY INCLUDING THE SAME

(71) Applicants: Samsung Electronics Co., Ltd., Suwon-si, Gyeonggi-do (KR); Samsung SDI Co., Ltd., Yongin-si, Gyeonggi-do (KR)

(72) Inventors: Insun Park, Suwon-si (KR); Hosang Park, Seoul (KR); Jinah Seo, Suwon-si (KR); Yoonsok Kang, Seongnam-si (KR); Dongyoung Kim, Yongin-si (KR); Minsik Park, Hwaseong-si (KR)

(73) Assignees: SAMSUNG ELECTRONICS CO., LTD., Gyeonggi-Do (KR); SAMSUNG SDI CO., LTD., Gyeonggi-Do (KR)

( * ) Notice: Subject to any disclaimer, the term of this patent is extended or adjusted under 35 U.S.C. 154(b) by 31 days.

(21) Appl. No.: 15/168,465

(22) Filed: May 31, 2016

(65) Prior Publication Data
US 2017/0077549 A1    Mar. 16, 2017

(30) Foreign Application Priority Data

Sep. 15, 2015  (KR) .................. 10-2015-0130601

(51) Int. Cl.
*H01M 10/0567* (2010.01)
*H01M 10/0565* (2010.01)
(Continued)

(52) U.S. Cl.
CPC ......... *H01M 10/0565* (2013.01); *H01M 4/04* (2013.01); *H01M 10/0525* (2013.01); *H01M 10/0567* (2013.01); *H01M 10/0569* (2013.01)

(58) Field of Classification Search
CPC ......... H01M 10/0565; H01M 10/0567; H01M 10/0525; H01M 4/04; H01M 10/0569
See application file for complete search history.

(56) References Cited

U.S. PATENT DOCUMENTS

| 5,731,106 | A  | 3/1998  | Tsutsumi et al. |
| 6,472,100 | B1 | 10/2002 | Maruta |

(Continued)

FOREIGN PATENT DOCUMENTS

| EP | 2541663 A1 | 1/2013 |
| FR | 2786029 A1 | 5/2000 |

(Continued)

OTHER PUBLICATIONS

Reversible chemical delithiation/lithiation of LiFePO4: towards a redox flow lithium-ion battery, Physical Chemistry Chemical Physics, 2013, 15, 1793-1797.*

(Continued)

*Primary Examiner* — Cynthia K Walls
(74) *Attorney, Agent, or Firm* — Cantor Colburn LLP

(57) ABSTRACT

An electrolyte for a secondary battery includes a non-aqueous solvent; a lithium salt; and a heterocyclic compound represented by Formula 1:

Formula 1

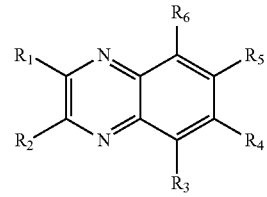

wherein, in Formula 1, $R_1$ and $R_2$ are each independently selected from hydrogen, a halogen group, a cyano group, a hydroxy group, a nitro group, —C(=O)$R_a$, —C(=O)O$R_a$, —OCO(O$R_a$), —C=N($R_a$), a substituted or unsubstituted (Continued)

$C_1$-$C_{20}$ alkyl group, and a combination thereof, wherein $R_a$ is selected from hydrogen and a $C_1$-$C_{10}$ alkyl group, and, provided that at least one selected from $R_1$ and $R_2$ is selected from a halogen group, a cyano group, a hydroxy group, a nitro group, —C(=O)$R_a$, —C(=O)O$R_a$, a substituted or unsubstituted $C_1$-$C_{20}$ alkyl group, and a combination thereof.

24 Claims, 14 Drawing Sheets

(51) Int. Cl.
*H01M 10/0525* (2010.01)
*H01M 4/04* (2006.01)
*H01M 10/0569* (2010.01)

(56) References Cited

U.S. PATENT DOCUMENTS

| | | | |
|---|---|---|---|
| 7,851,092 | B2 | 12/2010 | Amine et al. |
| 2006/0210883 | A1 | 9/2006 | Chen et al. |
| 2008/0318136 | A1 | 12/2008 | Amine et al. |
| 2011/0206979 | A1 | 8/2011 | Giroud et al. |
| 2014/0370405 | A1* | 12/2014 | Zhang ............ H01M 8/20 429/418 |

FOREIGN PATENT DOCUMENTS

| | | |
|---|---|---|
| JP | 09106833 A | 4/1997 |
| JP | 1999111335 A | 4/1999 |
| JP | 4167450 B2 | 8/2008 |

OTHER PUBLICATIONS

Edstrom et al., "A new look at the solid electrolyte interphase on graphite anodes in Li-ion batteries", Journal of Power Sources, 153, 2006, pp. 380-384.

European Search Report for European Patent Application No. 16181298.7 dated Jan. 30, 2017.

* cited by examiner

ELECTROLYTE FOR SECONDARY BATTERY AND SECONDARY BATTERY INCLUDING THE SAME

CROSS-REFERENCE TO RELATED APPLICATION

This application claims priority to and the benefit of Korean Patent Application No. 10-2015-0130601, filed on Sep. 15, 2015, in the Korean Intellectual Property Office, and all the benefits accruing therefrom under 35 U.S.C. § 119, the content of which is incorporated herein in its entirety by reference.

BACKGROUND

1. Field

The present disclosure relates to an electrolyte for a secondary battery and a secondary battery including the electrolyte.

2. Description of the Related Art

Secondary batteries are capable of being recharged. Lithium secondary batteries have a three times or more energy density per unit weight than lead storage batteries, nickel-cadmium batteries, nickel hydrogen batteries, and nickel zinc batteries and are capable of high rate charging.

Lithium secondary batteries provide a high operating voltage, and thus, a non-aqueous electrolyte is generally used therein instead of an aqueous electrolyte, which is more reactive with lithium. When a non-aqueous electrolyte is used in a lithium secondary battery, at the initial charging, due to a side reaction between a negative electrode or a positive electrode and the non-aqueous electrolyte, side products are formed on the surface of the negative electrode or the positive electrode. Accordingly, the lifespan of the lithium secondary battery may be reduced.

Therefore, there is a need for an electrolyte for a secondary battery and a secondary battery including the electrolyte having improved lifespan characteristics.

SUMMARY

Provided is an electrolyte for a secondary battery having improved capacity and lifespan characteristics.

Provided is a secondary battery including the electrolyte.

Additional aspects will be set forth in part in the description which follows and, in part, will be apparent from the description, or may be learned by practice of the presented exemplary embodiments.

According to an aspect of an exemplary embodiment, an electrolyte for a secondary battery includes: a non-aqueous solvent; a lithium salt; and a heterocyclic compound represented by Formula 1:

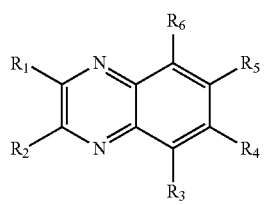

Formula 1 wherein, in Formula 1,
$R_1$ and $R_2$ are each independently selected from hydrogen, a halogen group, a cyano group, a hydroxy group, a nitro group, —C(=O)$R_a$, —C(=O)O$R_a$, —OCO(O$R_a$), —C=N($R_a$), a substituted or unsubstituted $C_1$-$C_{20}$ alkyl group, and a combination thereof, wherein $R_a$ is selected from hydrogen and a $C_1$-$C_{10}$ alkyl group, and $R_3$, $R_4$, $R_5$, and $R_6$ are each independently selected from hydrogen, a halogen group, a cyano group, a hydroxy group, —C(=O)$R_b$, —C(=O)O$R_b$, —OCO(O$R_b$), —C=N($R_b$), —S$R_b$, —S(=O)$R_b$, —S(=O)$_2R_b$, —P($R_b$)$_2$, a substituted or unsubstituted $C_1$-$C_{20}$ alkyl group, a substituted or unsubstituted $C_1$-$C_{20}$ alkoxy group, a substituted or unsubstituted $C_2$-$C_{20}$ alkenyl group, a substituted or unsubstituted $C_2$-$C_{20}$ alkynyl group, a $C_2$-$C_{20}$ alkylene oxide group, a substituted or unsubstituted $C_3$-$C_{30}$ cycloalkyl group, a substituted or unsubstituted $C_6$-$C_{30}$ aryl group, a substituted or unsubstituted $C_6$-$C_{30}$ aryloxy group, a substituted or unsubstituted $C_6$-$C_{30}$ heteroaryl group, and a combination thereof, wherein $R_b$ is selected from hydrogen, a $C_1$-$C_{10}$ alkyl group, and a $C_6$-$C_{20}$ aryl group, provided that at least one selected from $R_1$ and $R_2$ is selected from a halogen group, a cyano group, a hydroxy group, a nitro group, —C(=O)$R_a$, —C(=O)O$R_a$, a substituted or unsubstituted $C_1$-$C_{20}$ alkyl group, and a combination thereof.

According to an aspect of another exemplary embodiment, a secondary battery includes: a positive electrode including a positive active material; a negative electrode including a negative active material; and an electrolyte between the positive electrode and the negative electrode, wherein the electrolyte includes a non-aqueous organic solvent, a lithium salt, and a heterocyclic compound represented by Formula 1,

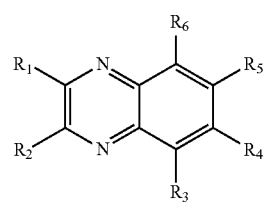

Formula 1 wherein, in Formula 1,
$R_1$ and $R_2$ are each independently selected from hydrogen, a halogen group, a cyano group, a hydroxy group, a nitro group, —C(=O)$R_a$, —C(=O)O$R_a$, —OCO(O$R_a$), —C=N($R_a$), a substituted or unsubstituted $C_1$-$C_{20}$ alkyl group, and a combination thereof, wherein $R_a$ is selected from hydrogen and a $C_1$-$C_{10}$ alkyl group, and $R_3$, $R_4$, $R_5$, and $R_6$ are each independently selected from hydrogen, a halogen group, a cyano group, a hydroxy group, —C(=O)$R_b$, —C(=O)O$R_b$, —OCO(O$R_b$), —C=N($R_b$), —S$R_b$, —S(=O)$R_b$, —S(=O)$_2R_b$, —P($R_b$)$_2$, a substituted or unsubstituted $C_1$-$C_{20}$ alkyl group, a substituted or unsubstituted $C_1$-$C_{20}$ alkoxy group, a substituted or unsubstituted $C_2$-$C_{20}$ alkenyl group, a substituted or unsubstituted $C_2$-$C_{20}$ alkynyl group, a $C_2$-$C_{20}$ alkylene oxide group, a substituted or unsubstituted $C_3$-$C_{30}$ cycloalkyl group, a substituted or unsubstituted $C_6$-$C_{30}$ aryl group, a substituted or unsubstituted $C_6$-$C_{30}$ aryloxy group, a substituted or unsubstituted $C_6$-$C_{30}$ heteroaryl group, and a combination thereof, wherein $R_b$ is selected from hydrogen, a $C_1$-$C_{10}$ alkyl group, and a $C_6$-$C_{20}$ aryl group, provided that at least one selected from $R_1$ and $R_2$ is selected from a halogen group, a cyano group, a hydroxy group, a nitro group, —C(=O)$R_a$, —C(=O)O$R_a$, a substituted or unsubstituted $C_1$-$C_{20}$ alkyl group, and a combination thereof.

Also disclosed is a method of preparing an electrolyte for a secondary battery, the method including: providing a non-aqueous organic solvent; providing a lithium salt; and combining the non-aqueous organic solvent and the lithium salt with a heterocyclic compound represented by Formula 1:

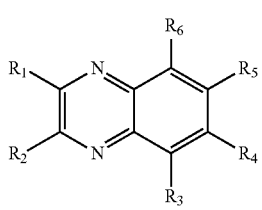

Formula 1 wherein, in Formula 1, $R_1$ and $R_2$ are each independently selected from hydrogen, a halogen group, a cyano group, a hydroxy group, a nitro group, —C(=O)$R_a$, —C(=O)O$R_a$, —OCO(O$R_a$), —C=N($R_a$), a substituted or unsubstituted $C_1$-$C_{20}$ alkyl group, and a combination thereof, wherein $R_a$ is selected from hydrogen and a $C_1$-$C_{10}$ alkyl group, and $R_3$, $R_4$, $R_5$, and $R_6$ are each independently selected from hydrogen, a halogen group, a cyano group, a hydroxy group, —C(=O)$R_b$, —C(=O)O$R_b$, —OCO(O$R_b$), —C=N($R_b$), —S$R_b$, —S(=O)$R_b$, —S(=O)$_2R_b$, —P($R_b$)$_2$, a substituted or unsubstituted $C_1$-$C_{20}$ alkyl group, a substituted or unsubstituted $C_1$-$C_{20}$ alkoxy group, a substituted or unsubstituted $C_2$-$C_{20}$ alkenyl group, a substituted or unsubstituted $C_2$-$C_{20}$ alkynyl group, a $C_2$-$C_{20}$ alkylene oxide group, a substituted or unsubstituted $C_3$-$C_{30}$ cycloalkyl group, a substituted or unsubstituted $C_6$-$C_{30}$ aryl group, a substituted or unsubstituted $C_6$-$C_{30}$ aryloxy group, a substituted or unsubstituted $C_6$-$C_{30}$ heteroaryl group, and a combination thereof, wherein $R_b$ is selected from hydrogen, a $C_1$-$C_{10}$ alkyl group, and a $C_6$-$C_{20}$ aryl group, provided that at least one selected from $R_1$ and $R_2$ is selected from a halogen group, a cyano group, a hydroxy group, a nitro group, —C(=O)$R_a$, —C(=O)O$R_a$, a substituted or unsubstituted $C_1$-$C_{20}$ alkyl group, and a combination thereof, to preparing the electrolyte.

Also disclosed is a method of manufacturing a secondary battery, the method including: providing a positive electrode including a positive active material and a negative electrode including a negative active material; and contacting the positive electrode and the negative electrode with the electrolyte disclosed above.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1:
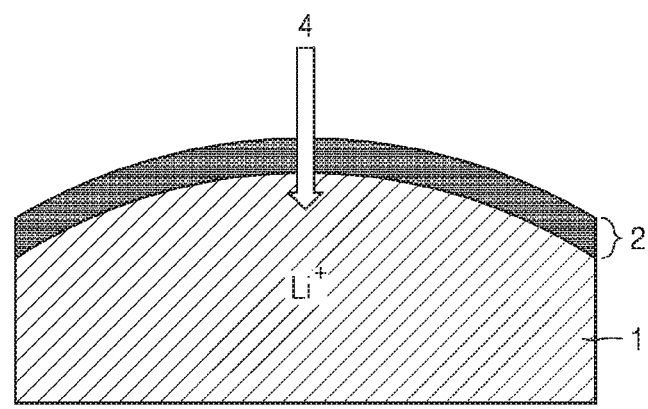
FIG. 1 illustrates a schematic view of an embodiment of formation of an SEI layer on a surface of a negative electrode including an electrolyte for a lithium secondary battery.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain various aspects.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers, and/or sections should not be limited by these terms. These terms are only used to distinguish one element, component, region, layer or section from another element, component, region, layer, or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. Expressions such as "at least one of," when preceding a list of elements, modify the entire list of elements and do not modify the individual elements of the list. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, with reference to the figures, an electrolyte for a secondary battery and a secondary battery including the electrolyte according to an exemplary embodiment will be described in further detail. However, the description is for illustrative purposes only and is not intended to limit the scope of this disclosure. The scope of this disclosure is indicated by the claims rather than by the detailed description.

In general, when charging a secondary battery, e.g., a lithium secondary battery, lithium ions may be electrodeposited on a surface of a negative electrode, and a decomposition reaction of an electrolyte on a surface of the electrodeposited lithium may occur, resulting in an increased resistance of the surface of the negative electrode. Also, lithium ions, which desirably reversibly react, may be consumed, decreasing the lifespan characteristics of the battery.

In addition, when charging a secondary battery, due to generation of moisture and acidic impurities on a surface of a positive electrode and irreversible oxidization of an electrolyte solvent, the performance of the positive electrode may decrease, further reducing the lifespan characteristics of the battery.

According to an exemplary embodiment, an electrolyte for a secondary battery may include a heterocyclic compound represented by Formula 1:

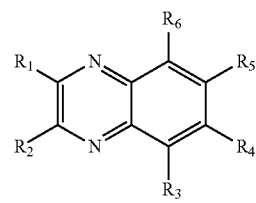

Formula 1 wherein, in Formula 1, $R_1$ and $R_2$ may be each independently selected from hydrogen, a halogen group, a cyano group, a hydroxy group, a nitro group, $-C(=O)R_a$, $-C(=O)OR_a$, $-OCO(OR_a)$, $-C=N(R_a)$, a substituted or unsubstituted $C_1$-$C_{20}$ alkyl group, and a combination thereof, wherein $R_a$ may be selected from hydrogen and a $C_1$-$C_{10}$ alkyl group, and $R_3$, $R_4$, $R_5$, and $R_6$ may be each independently selected from hydrogen, a halogen group, a cyano group, a hydroxy group, $-C(=O)R_b$, $-C(=O)OR_b$, $-OCO(OR_b)$, $-C=N(R_b)$, $-SR_b$, $-S(=O)R_b$, $-S(=O)_2R_b$, $-P(R_b)_2$, a substituted or unsubstituted $C_1$-$C_{20}$ alkyl group, a substituted or unsubstituted $C_1$-$C_{20}$ alkoxy group, a substituted or unsubstituted $C_2$-$C_{20}$ alkenyl group, a substituted or unsubstituted $C_2$-$C_{20}$ alkynyl group, a $C_2$-$C_{20}$ alkylene oxide group, a substituted or unsubstituted $C_3$-$C_{30}$ cycloalkyl group, a substituted or unsubstituted $C_6$-$C_{30}$ aryl group, a substituted or unsubstituted $C_6$-$C_{30}$ aryloxy group, a substituted or unsubstituted $C_6$-$C_{30}$ heteroaryl group, and a combination thereof, wherein $R_b$ may be selected from hydrogen, a $C_1$-$C_{10}$ alkyl group, and a $C_6$-$C_{20}$ aryl group, provided that at least one selected from $R_1$ and $R_2$ is selected from a halogen group, a cyano group, a hydroxy group, a nitro group, $-C(=O)R_a$, $-C(=O)OR_a$, a substituted or unsubstituted $C_1$-$C_{20}$ alkyl group, and a combination thereof.

The heterocyclic compound represented by Formula 1 may have a structure of a benzopyrazine-based derivative, and may be a benzopyrazine-based derivative. The benzopyrazine-based derivative may comprise, unlike a benzopyrazine compound, an electron withdrawing group as a substituent of $R_1$ or/and $R_2$, and/or a chemically reactive group which is reactive to a surface of a negative electrode or/and a positive electrode.

As is further disclosed hereinafter, and while not wanting to be bound by theory, in order to improve lifespan characteristics, in particular electrochemical lifespan characteristics, an electrolyte of a secondary battery, e.g., an electrolyte of a lithium secondary battery, includes the heterocyclic compound represented by Formula 1. However, the description is to facilitate understanding and is not intended to limit the scope of this disclosure.

While not wanting to be bound by theory, it is understood that a solid electrolyte interface (SEI) layer, which may be on a surface of a negative electrode, may be formed when an electrolyte contacts the negative electrode by deposition or absorption of decomposition products generated due to a reductive decomposition reaction of electrolyte elements at the interface between the electrolyte and the negative electrode. The SEI layer may be porous. Due to such porosity, if lithium ions only permeate the SEI layer, while other electrolyte elements do not permeate the SEI layer, the performance of the battery may further improve. The irreversible reductive decomposition reaction that may cause a formation of the SEI layer may be related to an electrochemical reduction reaction of a surface functional group as well as a reduction reaction of electrolyte solvent molecules.

The heterocyclic compound represented by Formula 1 may have a high reduction potential, compared to the electrolyte solvent, e.g., a reduction potential of about 0 volts (V) to about 3.5 V, about 0.5 V to about 2.5V, or about 1 V to about 2 V, versus $Li/Li^+$. While not wanting to be bound by theory, it is understood that the heterocyclic compound represented by Formula 1 may have a high reduction potential, compared with the electrolyte solvent, because hydrogen atoms, which may be bound to carbon atoms between two "N" atoms, which may be at a core of a benzopyrazine ring, each having an electron lone pair, may each be substituted with a group selected from an electron withdrawing group, a chemically reactive group with a surface of a negative electrode or/and a positive electrode, and a combination thereof, thereby withdrawing electrons from the benzopyrazine ring.

Accordingly, it is understood that the heterocyclic compound represented by Formula 1 may be reduced before the electrolyte solvent is electrochemically reduced, thus forming a reaction product that is insoluble in the electrolyte and an SEI layer including the reaction products on a surface of a negative electrode.

While not wanting to be bound by theory, it is understood that the SEI layer reduces generation of gas, e.g., a side product, and also increases the stability of the SEI layer. Therefore, a secondary battery including the electrolyte including the heterocyclic compound represented by Formula 1 may have improved lifespan characteristics.

In addition, the heterocyclic compound represented by Formula 1 may be bound to metal ions eluted from a positive active material, forming a coating film (protective layer) on a surface of a positive electrode. Accordingly, additional elution of metal ions may be prevented, thereby forming a stable coating film (protective layer) on the surface of the positive electrode.

Therefore, a secondary battery including the electrolyte including the heterocyclic compound represented by Formula 1 may have improved lifespan characteristics.

In some embodiments, the heterocyclic compound may be represented by Formula 2:

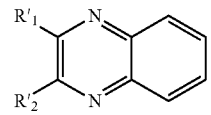

Formula 2 wherein, in Formula 2, $R'_1$ and $R'_2$ may be each independently selected from hydrogen, a halogen group, a cyano group, a hydroxy group, a nitro group, —C(=O)$R_c$, —C(=O)O$R_c$, —OCO(O$R_c$), —C=N($R_c$), a substituted or unsubstituted $C_1$-$C_{20}$ alkyl group, and a combination thereof, wherein $R_c$ may be selected from hydrogen and a $C_1$-$C_{10}$ alkyl group, provided that $R'_1$ and $R'_2$ are not both hydrogen.

In some embodiments, in Formula 2, $R'_1$ may be selected from a halogen group, a cyano group, a hydroxy group, a nitro group, —C(=O)$R_c$, —C(=O)O$R_c$, a substituted or unsubstituted $C_1$-$C_{20}$ alkyl group, and a combination thereof, and $R'_2$ may be selected from hydrogen, a halogen group, a cyano group, a hydroxy group, a nitro group, —C(=O)$R_c$, —C(=O)O$R_c$, a substituted or unsubstituted $C_1$-$C_{20}$ alkyl group, and a combination thereof.

In some embodiments, the heterocyclic compound may comprise a compound selected from Compounds 1 to 4:

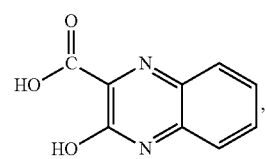

1

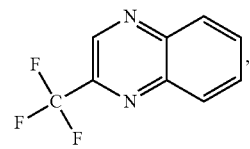

2

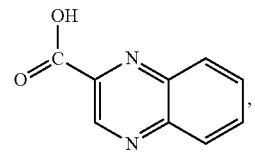

3

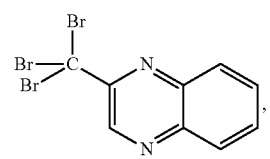

4 and.
a combination thereof.

The amount of the heterocyclic compound may be in a range of about 0.005 weight percent (weight %) to about 10 weight %, based on a total weight of the electrolyte. In some embodiments, the amount of the heterocyclic compound may be in a range of about 0.005 weight % to about 8 weight %, based on a total weight of the electrolyte. In some embodiments, the amount of the heterocyclic compound may be in a range of about 0.05 weight % to about 6 weight %, based on a total weight of the electrolyte. In some embodiments, the amount of the heterocyclic compound may be in a range of about 0.05 weight % to about 4 weight %, based on a total weight of the electrolyte. In some embodiments, the amount of the heterocyclic compound may be in a range of about 0.05 weight % to about 2 weight %, based on a total weight of the electrolyte.

When the amount of the heterocyclic compound is within these ranges, an improved SEI layer or/and coating film may be formed on a surface of a negative electrode or/and a positive electrode. For example, the SEI layer or/and coating film may have an improved thickness, e.g., a thickness of about 0.001 micrometers (μm) to about 1 μm, or about 0.01 μm to about 0.1 μm. Furthermore, the thin SEI layer or/and coating film may suppress an additional decomposition reaction of an electrolyte and reduce the resistance of the electrodes, thereby improving lifespan characteristics of a secondary battery including the electrolyte.

The electrolyte may further include a lithium salt and a non-aqueous organic solvent.

The lithium salt may comprise a salt selected from LiSCN, LiN(CN)$_2$, LiClO$_4$, LiAlO$_4$, LiAlCl$_4$, LiBF$_4$, LiAsF$_6$, LiPF$_6$, LiCF$_3$SO$_3$, Li(CF$_3$SO$_2$)$_2$N, LiC$_4$F$_9$SO$_3$, Li(CF$_3$SO$_2$)$_3$C, LiN(SO$_2$F)$_2$, LiN(SO$_2$CF$_3$)$_2$, LiN(SO$_2$CF$_2$CF$_3$)$_2$, LiSbF$_6$, LiPF$_3$(CF$_2$CF$_3$)$_3$, LiPF$_3$(CF$_3$)$_3$, LiB(C$_2$O$_4$)$_2$, and a combination thereof.

The lithium salt may be dissolved in a non-aqueous organic solvent. The lithium salt may serve as a source of lithium ions in a lithium secondary battery, and thus may enable operation of the lithium secondary battery. The lithium salt may also serve to promote migration of lithium ions between a positive electrode and a negative electrode.

The lithium salt may be a supporting electrolytic salt.

Although the concentration of the lithium salt is not particularly limited, the concentration may be as is present in commercially available batteries, and more particularly, the concentration may be in a range of about 0.1 molar (M) to about 2.0 M in an electrolyte. When the concentration of the lithium salt is within this range, the electrolyte concentration may be suitable, may thus provide improved performance of the electrolyte. In addition, the viscosity of the electrolyte may be suitable, and thus may provide improved mobility of lithium ions.

The non-aqueous organic solvent may comprise a solvent selected from ethylene carbonate, propylene carbonate, dimethyl carbonate, diethyl carbonate, ethyl methyl carbonate, fluoroethylene carbonate, fluoropropylene carbonate, difluoropropylene carbonate, trifluoropropylene glycol ester, γ-butyrolactone, chloro-γ-butyrolactone, dichloro-γ-butyrolactone, bromopropylene carbonate, dibromopropylene carbonate, tribromopropylene glycol ester, bromo-γ-butyrolactone, dibromo-γ-butyrolactone, nitropropylene carbonate, nitro-γ-butyrolactone, cyanopropylene carbonate, cyano-γ-butyrolactone, 1,2-dimethoxy ethane, diepoxy ethane, dimethylene glycol dimethyl ether, trimethylene glycol dimethyl ether, tetraethylene glycol dimethyl ether, polyethylene glycol dimethyl ether, succinonitrile, sulfolane, dimethyl sulfone, ethyl methyl sulfone, diethyl sulfone, adiponitrile, 1,1,2,2-tetrafluoroethyl 2,2,3,3-tetrafluoropropyl ether, tetraphenylethene 2,2,2-trifluoro ethanol, and a combination thereof.

The non-aqueous organic solvent used in the electrolyte may serve as a migration medium of ions involved in electrochemical reactions of the battery. The non-aqueous organic solvent may react with the heterocyclic compound. The product of the reaction may be included in an SEI layer or/and coating film on a surface of a negative electrode or/and positive electrode, forming a stable SEI layer or/and coating film.

A secondary battery according to another aspect may include a positive electrode including a positive active material; a negative electrode including a negative active material; and an electrolyte between the positive electrode and the negative electrode, wherein the electrolyte may include a non-aqueous organic solvent and a heterocyclic compound represented by Formula 1:

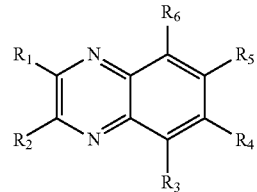

Formula 1 wherein, in Formula 1, $R_1$ and $R_2$ may be each independently selected from hydrogen, a halogen group, a cyano group, a hydroxy group, a nitro group, —C(=O)R$_a$, —C(=O)OR$_a$, —OCO(OR$_a$), —C=N(R$_a$), a substituted or unsubstituted C$_1$-C$_{20}$ alkyl group, and a combination thereof, wherein R$_a$ may be selected from hydrogen and a C$_1$-C$_{10}$ alkyl group, and $R_3$, $R_4$, $R_5$, and $R_6$ may be each independently selected from hydrogen, a halogen group, a cyano group, a hydroxy group, —C(=O)R$_b$, —C(=O)OR$_b$, —OCO(OR$_b$), —C=N(R$_b$), —SR$_b$, —S(=O)R$_b$, —S(=O)$_2$R$_b$, —P(R$_b$)$_2$, a substituted or unsubstituted C$_1$-C$_{20}$ alkyl group, a substituted or unsubstituted C$_1$-C$_{20}$ alkoxy group, a substituted or unsubstituted C$_2$-C$_{20}$ alkenyl group, a substituted or unsubstituted C$_2$-C$_{20}$ alkynyl group, a C$_2$-C$_{20}$ alkylene oxide group, a substituted or unsubstituted C$_3$-C$_{30}$ cycloalkyl group, a substituted or unsubstituted C$_6$-C$_{30}$ aryl group, a substituted or unsubstituted C$_6$-C$_{30}$ aryloxy group, a substituted or unsubstituted C$_6$-C$_{30}$ heteroaryl group, and a combination thereof, wherein R$_b$ may be selected from hydrogen, a C$_1$-C$_{10}$ alkyl group, and a C$_6$-C$_{20}$ aryl group, provided that at least one selected from $R_1$ and $R_2$ is selected from a halogen group, a cyano group, a hydroxy group, a nitro group, —C(=O)R$_a$, —C(=O)OR$_a$, a substituted or unsubstituted C$_1$-C$_{20}$ alkyl group, and a combination thereof.

The heterocyclic compound represented by Formula 1 may be reduced before the electrolyte solvent is electrochemically reduced, i.e., have a greater reduction potential, thus may form a reaction product that is insoluble in the electrolyte and an SEI layer including the reaction product on a surface of a negative electrode. Such an SEI layer may reduce generation of gas, i.e., a side product, and also may increase the stability of the SEI layer. Therefore, a secondary battery including the electrolyte including the heterocyclic compound represented by Formula 1 may have improved lifespan characteristics.

In addition, the heterocyclic compound represented by Formula 1 may be bound to a metal ion eluted from a positive active material, and may form a coating film (e.g., a protective layer) on a surface of a positive electrode. Accordingly, additional elution of metal ions may be prevented, thereby forming a stable coating film (e.g., a protective layer) on the surface of the positive electrode.

Therefore, and while not wanting to be bound by theory, a secondary battery including the electrolyte including the heterocyclic compound represented by Formula 1 may have improved lifespan characteristics for this reason as well.

In some embodiments, the heterocyclic compound may be represented by Formula 2:

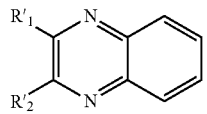

Formula 2 wherein, in Formula 2, $R'_1$ and $R'_2$ may be each independently selected from hydrogen, a halogen group, a cyano group, a hydroxy group, a nitro group, —C(=O)$R_c$, —C(=O)O$R_c$, —OCO(O$R_c$), —C=N($R_c$), a substituted or unsubstituted $C_1$-$C_{20}$ alkyl group, and a combination thereof, wherein $R_c$ may be selected from hydrogen and a $C_1$-$C_{10}$ alkyl group, provided that $R'_1$ and $R'_2$ are not both hydrogen.

In some embodiments, in Formula 2, $R'_1$ may be selected from a halogen group, a cyano group, a hydroxy group, a nitro group, —C(=O)$R_c$, —C(=O)O$R_c$, a substituted or unsubstituted $C_1$-$C_{20}$ alkyl group, and a combination thereof, and $R'_2$ may be selected from hydrogen, a halogen group, a cyano group, a hydroxy group, a nitro group, —C(=O)$R_c$, —C(=O)O$R_c$, a substituted or unsubstituted $C_1$-$C_{20}$ alkyl group, and a combination thereof.

In some embodiments, the heterocyclic compound may include compound selected from Compounds 1 to 4:

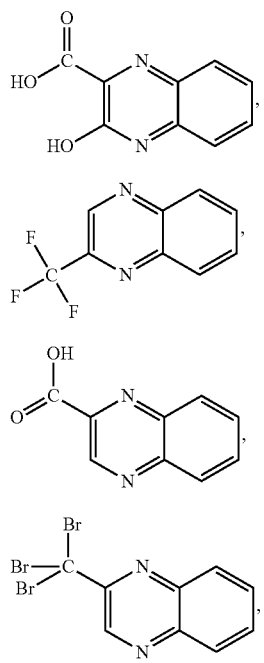

and a combination thereof.

The non-aqueous organic solvent may comprise a solvent selected from ethylene carbonate, propylene carbonate, dimethyl carbonate, diethyl carbonate, ethyl methyl carbonate, fluoroethylene carbonate, fluoropropylene carbonate, difluoropropylene carbonate, trifluoropropylene glycol ester, γ-butyrolactone, chloro-γ-butyrolactone, dichloro-γ-butyrolactone, bromopropylene carbonate, dibromopropylene carbonate, tribromopropylene glycol ester, bromo-γ-butyrolactone, dibromo-γ-butyrolactone, nitropropylene carbonate, nitro-γ-butyrolactone, cyanopropylene carbonate, cyano-γ-butyrolactone, 1,2-dimethoxy ethane, diepoxy ethane, dimethylene glycol dimethyl ether, trimethylene glycol dimethyl ether, tetraethylene glycol dimethyl ether, polyethylene glycol dimethyl ether, succinonitrile, sulfolane, dimethyl sulfone, ethyl methyl sulfone, diethyl sulfone, adiponitrile, 1,1,2,2-tetrafluoroethyl 2,2,3,3-tetrafluoropropyl ether, tetraphenylethene 2,2,2-trifluoro ethanol, and a combination thereof.

The non-aqueous organic solvent used in the electrolyte may serve as a migration medium of ions involved in electrochemical reactions of the battery. The non-aqueous organic solvent may react with the heterocyclic compound. The product of the reaction may be included in an SEI layer and/or a coating film on a surface of a negative electrode or/and positive electrode, forming a stable SEI layer and/or coating film.

The electrolyte may further include a lithium salt.

The lithium salt may be a salt selected from LiSCN, LiN(CN)$_2$, LiClO$_4$, LiAlO$_4$, LiAlCl$_4$, LiBF$_4$, LiAsF$_6$, LiPF$_6$, LiCF$_3$SO$_3$, Li(CF$_3$SO$_2$)$_2$N, LiC$_4$F$_9$SO$_3$, Li(CF$_3$SO$_2$)$_3$C, LiN(SO$_2$F)$_2$, LiN(SO$_2$CF$_3$)$_2$, LiN(SO$_2$CF$_2$CF$_3$)$_2$, LiSbF$_6$, LiPF$_3$(CF$_2$CF$_3$)$_3$, LiPF$_3$(CF$_3$)$_3$, LiB(C$_2$O$_4$)$_2$, and a combination thereof.

The lithium salt may be dissolved in a non-aqueous organic solvent. The lithium salt may serve as a source of lithium ions in a lithium secondary battery, and may enable operation of the lithium secondary battery. The lithium salt may also serve to promote migration of lithium ions between a positive electrode and a negative electrode.

The lithium salt may be used as a supporting electrolytic salt.

Although the concentration of the lithium salt is not particularly limited, the concentration may be as is used in commercially available batteries, and more particularly, the concentration may be in a range of about 0.1 M to about 2 M in an electrolyte. When the concentration of the lithium salt is within this range, the electrolyte concentration may suitable, and may provide improve performance. In addition, the viscosity of the electrolyte may be suitable at the foregoing concentration, and may provide improved lithium ion mobility.

FIG. 1 illustrates a schematic view of an embodiment of an SEI layer 2 formed on a surface of a negative electrode 1 and an electrolyte 4 for a lithium secondary battery.

As shown in FIG. 1, the negative electrode may include the SEI layer 2 that may include a reaction product of the heterocyclic compound on a surface of the negative electrode.

The SEI layer 2 may protect a surface of a negative electrode and have improved ion permeability, e.g., lithium ion permeability.

The SEI layer 2 may be formed, for example, when the electrolyte 4 includes the heterocyclic compound represented by Formula 1, and in the heterocyclic compound, $R_1$ and $R_2$ includes a group selected from a halogen group, a cyano group, a hydroxy group, a nitro group, —C(=O)$R_a$, —C(=O)O$R_a$, a substituted or unsubstituted $C_1$-$C_{20}$ alkyl group, and a combination thereof, e.g., a group selected from an electron withdrawing group, a group which is chemically reactive with a surface of a negative electrode, and a combination thereof.

For example, a compound selected from Compounds 1 to 4, and a combination thereof may be applicable thereto.

The positive electrode may further include a coating film on a surface of the positive electrode, wherein the coating film may include the heterocyclic compound or a reaction product of the heterocyclic compound in the electrolyte 4. An embodiment in which a coating film comprising the heterocyclic compound and a reaction product of the heterocyclic compound in the electrolyte 4 is mentioned.

Figure 2:
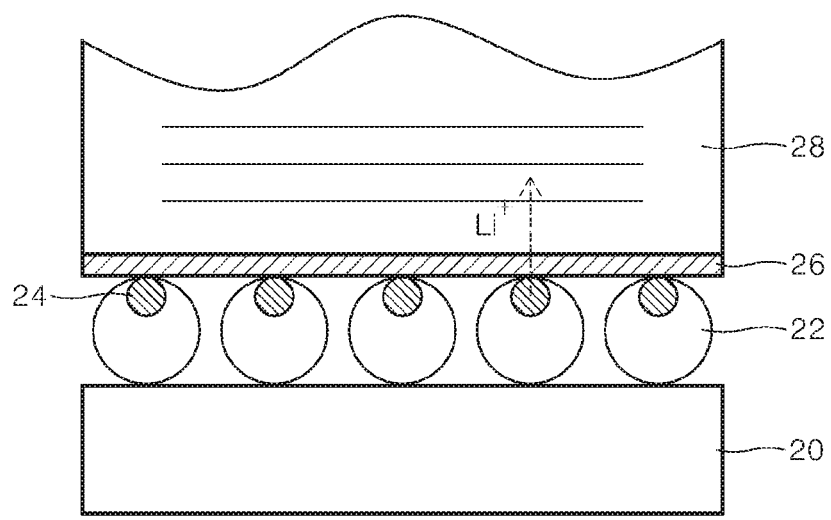
FIG. 2 illustrates a schematic view of an embodiment of formation of a coating film on a surface of a positive electrode including an electrolyte for a lithium secondary battery.

FIG. 2 illustrates an embodiment of a schematic view of a formation of a coating film 26 on a surface of a positive electrode including an electrolyte 28 for a lithium secondary battery.

As shown in FIG. 2, the thin and solid coating film 26, which may be derived from the heterocyclic compound and/or a reaction product of the heterocyclic compound in the electrolyte, may be formed on a surface of a positive active material 22 that is on a positive electrode current collector 20, and thus, lithium ions 24 may be effectively transferred from the positive electrode to the electrolyte 28. The thickness of the solid coating film 26 may be about 0.001 μm to about 1 μm, or about 0.01 μm to about 0.1 μm.

The coating film 26 may be disposed on, e.g., formed on, a surface of a positive electrode, for example, when the electrolyte 28 includes the heterocyclic compound represented by Formula 1, and in the heterocyclic compound, at least one selected from $R_1$ and $R_2$ may comprise a group selected from —C(=O)$R_a$, —C(=O)O$R_a$, a substituted or unsubstituted $C_1$-$C_{20}$ alkyl group, and a combination thereof, e.g., a group which is chemically reactive with a surface of a positive electrode.

For example, Compound 1 and/or Compound 3 may be applicable thereto.

The amount of the heterocyclic compound may be in a range of about 0.005 weight percent (weight %) to about 10 weight %, based on a total weight of the electrolyte. In some embodiments, the amount of the heterocyclic compound may be in a range of about 0.005 weight % to about 8 weight %, based on a total weight of the electrolyte. In some embodiments, the amount of the heterocyclic compound may be in a range of about 0.05 weight % to about 6 weight %, based on a total weight of the electrolyte. In some embodiments, the amount of the heterocyclic compound may be in a range of about 0.05 weight % to about 4 weight %, based on a total weight of the electrolyte. In some embodiments, the amount of the heterocyclic compound may be in a range of about 0.05 weight % to about 2 weight %, based on a total weight of the electrolyte.

When the amount of the heterocyclic compound is within these ranges, a SEI layer having a suitable thickness and/or a coating film may be formed on a surface of a negative electrode and/or a positive electrode. Furthermore, and while not wanting to be bound by theory, it is understood that the SEI layer and/or coating film may suppress an additional decomposition reaction of an electrolyte and reduce the resistance of the electrodes, thereby improving lifespan characteristics of a secondary battery including the electrolyte.

A positive active material, a conductive agent, a binder, and a solvent may be mixed to prepare a positive electrode slurry composition. The positive electrode slurry composition may be directly coated on a positive electrode current collector and dried to form a positive electrode active material layer thereon, thereby forming a positive electrode.

Alternatively, the positive electrode slurry composition may be cast on a separate support to form a positive electrode active material layer, which then may be separated from the support and laminated on the positive electrode current collector to form a positive electrode active material layer thereon, thereby forming a positive electrode.

As for the material for a positive active material, any suitable material, such as those used in the art, may be used, such as a lithium containing metal oxide, without limitation. In some embodiments, a positive active material may include a composite oxide of a metal selected from cobalt, manganese, nickel, and a combination thereof and lithium. A combination comprising a plurality of composite oxides may be used. Exemplary examples of the positive active material may include a compound selected from $Li_aA_{1-b}B'_bD'_2$ (wherein $0.90 \leq a \leq 1$ and $0 \leq b \leq 0.5$); $Li_aE_{1-b}B'_bO_{2-c}D'_c$ (wherein $0.90 \leq a \leq 1$, $0 b \leq 0.5$, and $0 \leq c \leq 0.05$); $LiE_{2-b}B'_bO_{4-c}D'_c$ (wherein $0 \leq b \leq 0.5$ and $0 \leq c \leq 0.05$); $Li_aNi_{1-b-c}Co_bB'_cD'_\alpha$ (wherein $0.90 \leq a \leq 1$, $0 \leq b \leq 0.5$, $0 \leq c \leq 0.05$, and $0 < \alpha \leq 2$); $Li_aNi_{1-b-c}Co_bB'_cO_{2-\alpha}F'_\alpha$ (wherein $0.90 \leq a \leq 1$, $0 \leq b \leq 0.5$, $0 \leq c \leq 0.05$, and $0 < \alpha < 2$); $Li_aNi_{1-b-c}Co_bB'_cO_{2-\alpha}F'_2$ (wherein $0 \leq b \leq 0.5$, $0 \leq c \leq 0.05$, and $0 < \alpha \leq 2$); $Li_aNi_{1-b-c}Mn_bB'_cD'_\alpha$ (wherein $0.90 \leq a \leq 1$, $0 \leq c \leq 0.05$, and $0 < \alpha < 2$); $Li_aNi_{1-b-c}Mn_bB'_cO_{2-\alpha}F'_\alpha$ (wherein $0.90 \leq a \leq 1$, $0 \leq c \leq 0.05$, and $0 < \alpha < 2$); $Li_aNi_{1-b-c}Mn_bB'_cO_{2-\alpha}F'_2$ (wherein $0.90 \leq a \leq 1$, $0 \leq b \leq 0.5$, $0 \leq c \leq 0.05$, and $0 < \alpha < 2$); $Li_aNi_bE_cG_dO_2$ (wherein $0.90 \leq a \leq 1$, $0 \leq b \leq 0.9$, $0 \leq c \leq 0.5$, and $0.001 \leq d \leq 0.1$); $Li_aNi_bCo_cMn_dGeO_2$ (wherein $0.90 \leq a \leq 1$, $0 \leq b \leq 0.9$, $0 \leq c \leq 0.5$, $0 \leq d \leq 0.5$, and $0.001 \leq e \leq 0.1$); $Li_aNiGbO_2$ (wherein $0.90 \leq a \leq 1$ and $0.001 \leq b \leq 0.1$); $Li_aCoG_bO_2$ (wherein $0.90 \leq a \leq 1$ and $0.001 \leq b \leq 0.1$); $Li_aMnG_bO_2$ (wherein $0.90 \leq a \leq 1$ and $0.001 \leq b \leq 0.1$); $Li_aMn_2G_bO_4$ (wherein $0.90 \leq a \leq 1$ and $0.001 \leq b \leq 0.1$); $QO_2$; $QS_2$; $LiQS_2$; $V_2O_5$; $LiV_2O_5$; $LiI'O_2$; $LiNiVO_4$; $Li_{(3-f)}Fe_2(PO_4)_{3-f}J_2(PO_4)_3$ (wherein $0 \leq f \leq 2$); $Li_{(3-f)}Fe_2(PO_4)_3$ (wherein $0 \leq f \leq 2$); $LiFePO_4$, and a combination thereof.

In the formulae above, A is selected from nickel (Ni), cobalt (Co), manganese (Mn), and a combination thereof; B' is selected from aluminum (Al), nickel (Ni), cobalt (Co), manganese (Mn), chromium (Cr), iron (Fe), magnesium (Mg), strontium (Sr), vanadium (V), a rare earth element, and a combination thereof; D' is selected from oxygen (O), fluorine (F), sulfur (S), phosphorus (P), and a combination thereof; E is selected from cobalt (Co), manganese (Mn), and a combination thereof; F' is selected from fluorine (F), sulfur (S), phosphorus (P), and a combination thereof; G is selected from aluminum (Al), chromium (Cr), manganese (Mn), iron (Fe), magnesium (Mg), lanthanum (La), cerium (Ce), strontium (Sr), vanadium (V), and a combination thereof; Q is selected from titanium (Ti), molybdenum (Mo), manganese (Mn), and a combination thereof; I' is selected from chromium (Cr), vanadium (V), iron (Fe), scandium (Sc), yttrium (Y), and a combination thereof; and J is selected from vanadium (V), chromium (Cr), manganese (Mn), cobalt (Co), nickel (Ni), copper (Cu), and a combination thereof.

For example, the positive active material may include an oxide selected from $LiCoO_2$, $LiNi_{1-x}Co_xO_2$ (wherein $0 \leq x < 1$), $LiNi_xCo_yAl_zO_v$ (wherein $0 < x < 1$, $0 < y < 1$, $0 < z < 1$, and $2 \leq v \leq 4$), $Li_{1-x}M_xO_2$ (wherein M may include a transition metal selected from Mn, Fe, and a combination thereof and $0.03 < x < 0.1$), $Li[Ni_xCo_{1-2x}Mn_x]O_2$ (wherein $0 < x < 0.5$), $Li[Ni_xMn_y]O_z$ (wherein $0 < x < 1$, $0 < y < 2$, and $2 \leq z \leq 4$), $Li_{1+x}(Ni_aCo_xMn_c)_{1-y}O_z$ (wherein $0 < x \leq 1$, $0 \leq y < 1$, $2 \leq z \leq 4$, $0 < a < 1$, $0 < b < 1$, and $0 < c < 1$), $LiM_2O_4$ (wherein M may include at least one transition metal selected from Ti, V, Mn, and a combination thereof), $LiM_xMn_{2-x}O_4$ (wherein M may be a transition metal and 0≤x<2), LiFePO$_4$, LiMPO$_4$ (wherein M may include a transition metal selected from Mn, Co, Ni, and a combination thereof), V$_2$O$_5$, V$_2$O$_3$, VO$_2$(B), V$_6$O$_{13}$, V$_4$O$_9$, V$_3$O$_7$, Ag$_2$V$_4$O$_{11}$, AgVO$_3$, LiV$_3$O$_5$, δ-Mn$_y$V$_2$O$_5$, δ-NH$_4$V$_4$O$_{10}$, Mn$_{0.8}$V$_7$O$_{16}$, LiV$_3$O$_8$, Cu$_x$V$_2$O$_5$, Cr$_x$V$_6$O$_{13}$, M$_2$(XO$_4$)$_3$ (wherein M may be a transition metal and X may include an element selected from S, P, As, Mo, W, and a combination thereof), and Li$_3$M$_2$(PO$_4$)$_3$ (wherein M may include a transition metal selected from Fe, V, Ti, and a combination thereof).

The compounds listed above as positive active materials may have a surface coating layer (hereinafter, "coating layer"). Alternatively, a mixture of a compound without having a coating layer and a compound having a coating layer, the compounds being selected from the compounds listed above, may be used. The coating layer may include a compound of a coating element selected from oxide, hydroxide, oxyhydroxide, oxycarbonate, a hydroxycarbonate of the coating element, and a combination thereof. The compounds for the coating layer may be amorphous or crystalline. The coating element for the coating layer may be magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), and a combination thereof. The coating layer may be formed using any suitable method that does not adversely affect the physical properties of the positive active material when a compound of the coating element is used. For example, the coating layer may be formed using a spray coating method, or a dipping method, the details of which can be determined by those of ordinary skill in the art without undue experimentation, and thus a further detailed description thereof will be omitted.

Non-limiting examples of the conductive agent may include carbon black, graphite particulates, natural graphite, artificial graphite, acetylene black, Ketjen black, carbon fibers; carbon nanotubes; metallic materials, such as copper, nickel, aluminum, silver, and the like, and a combination thereof, and may be in powder, fiber, or tube form; and a conductive polymer, such as a polyphenylene derivative. Any suitable conductive agent available in the art may be used.

Non-limiting examples of the binder may include a vinylidene fluoride/hexafluoropropylene copolymer, polyvinylidene fluoride (PVDF), polyacrylonitrile, polymethylmethacrylate, polytetrafluoroethylene, and a combination thereof, and a styrene butadiene rubber polymer. Non-limiting examples of the solvent may include N-methyl-pyrrolidone (NMP), acetone, and water. Any suitable material available as a solvent in the art may be used.

Optionally, a plasticizer may be further added to the positive active material composition to form a positive electrode plate including pores.

The amount of the positive active material, the conductive agent, the binder, and the solvent used in the manufacture of the lithium secondary battery can be those amounts that are commercially used in the art. At least one of the conductive agent, the binder, and the solvent may be omitted depending on the use and the structure of the lithium battery.

The positive electrode current collector may have a thickness of about 3 micrometers (μm) to about 500 μm. The positive electrode current collector is not particularly limited, and may be any suitable material as long as the positive electrode current collector has a suitable electrical conductivity without causing undesirable chemical changes in the battery. Examples of the positive electrode current collector may include copper, stainless steel, aluminum, nickel, titanium, sintered carbon, copper or stainless steel that is surface-treated with carbon, nickel, titanium or silver, and aluminum-cadmium alloys. In addition, the positive electrode current collector may be processed to have a modulation on a surface thereof so as to enhance a binding strength of the positive active material to the positive electrode current collector, and may be used in various forms including films, sheets, foils, nets, porous structures, foams, and non-woven fabrics.

The mixture density of the positive electrode may be 2.0 grams per cubic centimeter (g/cc) or more.

The negative electrode may be manufactured as follows. A negative electrode of the lithium battery may be manufactured in the same manner as the positive electrode, except for using a negative active material, instead of the positive active material. In addition, a conductive agent, a binder, and a solvent in a negative electrode slurry composition may be the same as in the method of preparing the positive electrode.

For example, a negative active material, a binder, a solvent, and optionally a conductive agent may be mixed together to prepare a negative electrode slurry composition. The negative electrode slurry composition may be coated on a negative electrode current collector to prepare a negative electrode. Alternatively, the negative electrode slurry composition may be cast on a separate support to form a negative electrode active material film, which then may be separated from the support and laminated on a negative electrode current collector to form a negative electrode.

As for the negative active material, any suitable negative active material that is used in the art as a negative active material for a lithium secondary battery may be used. In some embodiments, the negative active material may include a material selected from a lithium metal, a metal alloyable with lithium, a transition metal oxide, a non-transition metal oxide, a carbonaceous material, and a combination thereof.

Examples of the metal alloyable with lithium include Si, Sn, Al, Ge, Pb, Bi, Sb, a Si—Y' alloy (wherein Y' may be selected from an alkali metal, an alkaline earth metal, a Group 13 and 14 element, a transition metal, a rare earth element, and a combination thereof except for Si), and a Sn—Y' alloy (wherein Y' is selected from an alkali metal, an alkaline earth metal, a Group 13 and 14 element, a transition metal, a rare earth element, and a combination thereof except for Sn). Y' may be selected from magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), germanium (Ge), phosphorus (P), arsenic (As), antimony (Sb), bismuth (Bi), sulfur (S), selenium (Se), tellurium (Te), polonium (Po), and a combination thereof.

For example, the transition metal oxide may be a lithium titanium oxide, a vanadium oxide, or a lithium vanadium oxide. A combination of the foregoing may be used.

For example, the non-transition metal oxide may be SnO$_2$ or SiO$_x$ (wherein 0<x<2).

The carbonaceous material may be selected from a crystalline carbon, an amorphous carbon, and a combination thereof. The crystalline carbon may be graphite, such as natural graphite or artificial graphite, and may be in plate, flake, spherical, or fibrous form. The amorphous carbon may be selected from a soft carbon (e.g., a carbon sintered at a low temperatures, e.g., between 600° C. and 1500° C.), a hard carbon (e.g., a carbon sintered at above 1500° C.), a mesophase pitch carbides, a sintered cork, and a combination thereof.

For example, the negative active material may comprise an oxide selected from vanadium oxide, lithium vanadium oxide, silicon (Si), $SiO_x$ (wherein $0<x<2$), an Si—Y' alloy (wherein Y' may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ge, P, As, Sb, Bi, S, Se, Te, Po, and a combination thereof), graphite, soft carbon, hard carbon, mesophase pitch carbides, sintered cork, and a combination thereof.

The amounts of the negative active material, the conductive agent, the binder, and the solvent used in the manufacture of the lithium secondary battery may be amounts used in the art.

The negative electrode current collector may have a thickness of about 3 μm to about 500 μm. The negative electrode current collector is not particularly limited, and may be any suitable material as long as the negative electrode current collector has a suitable electrical conductivity without causing undesirable chemical changes in the battery. Examples of the negative electrode current collector include copper, stainless steel, aluminum, nickel, titanium, sintered carbon, copper or stainless steel that is surface-treated with carbon, nickel, titanium or silver, and aluminum-cadmium alloys. In addition, the negative electrode current collector may be processed to have a modulation on a surface thereof so as to enhance the binding strength of the negative active material to the negative electrode current collector, and may be used in various forms including films, sheets, foils, nets, porous structures, foams, and non-woven fabrics.

In some embodiments, the positive electrode and the negative electrode may be separated from each other by a separator. Any suitable separator, including a separator that is used in lithium secondary batteries may be used. Particularly, the separator may have low resistance to migration of ions in an electrolyte and have electrolytic solution-retaining ability. Examples of the separator may include glass fiber, polyester, polyethylene, polypropylene, polytetrafluoroethylene (PTFE), and a combination thereof, each of which may be a nonwoven fabric or a woven fabric. The pore diameter of separator may be about 0.01 μm to about 10 μm, and a thickness thereof may be about 5 μm to about 300 μm.

Secondary batteries, e.g., lithium secondary batteries, may be classified as a lithium ion secondary battery, a lithium ion polymer secondary battery, and a lithium polymer secondary battery according to the type of the separator and electrolyte. In addition, a lithium secondary battery may be classified as a cylindrical type, a rectangular type, a coin type, or a pouch type according to the shape of the battery, and may also be classified as a bulk type or a thin film type according to the size of the battery.

Methods of manufacturing these lithium secondary batteries are widely known in the art, and thus a further detailed description thereof will not be provided here.

Figure 3:
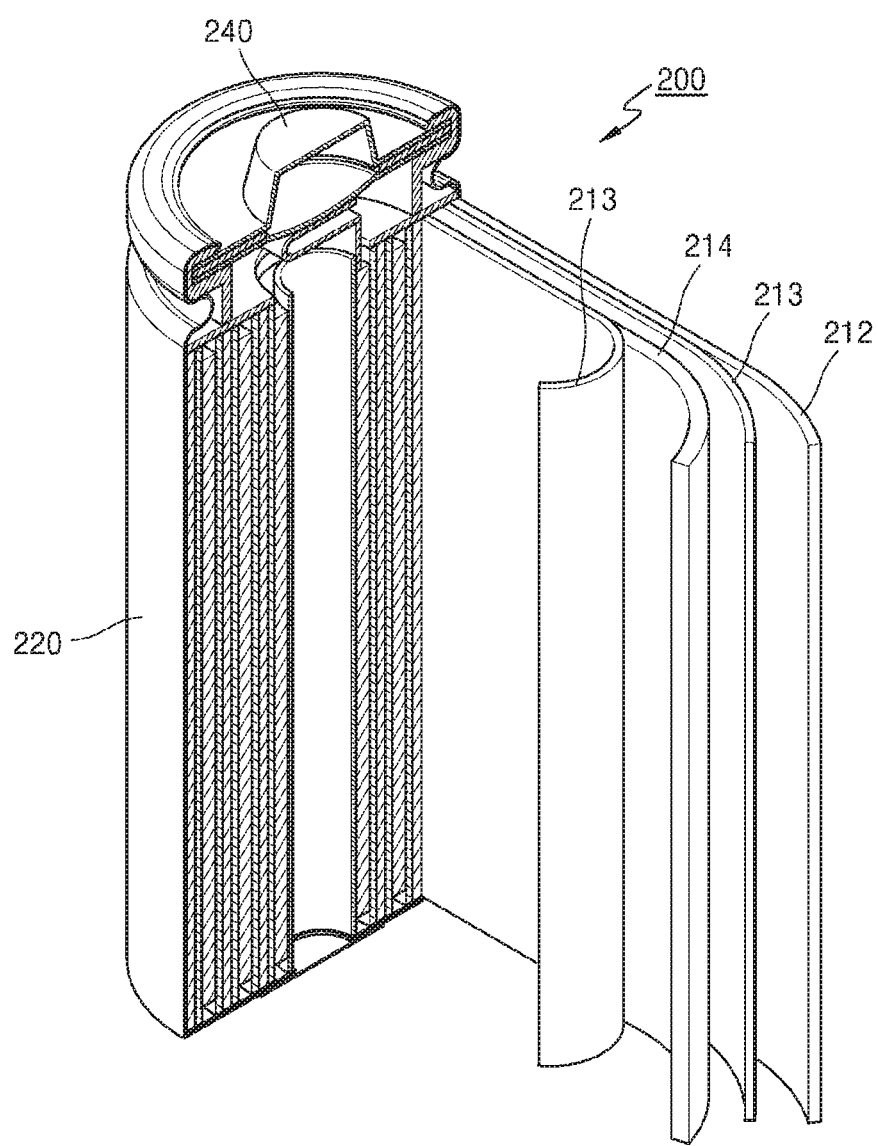
FIG. 3 illustrates a schematic view of an embodiment of a structure of a lithium secondary battery.

FIG. 3 illustrates an embodiment of a schematic view of a structure of a lithium secondary battery 200.

Referring to FIG. 3, the lithium secondary battery 200 may include a positive electrode 214, a separator 213, and a negative electrode 212. The positive electrode 214, the separator 213, and the negative electrode 212 of the lithium secondary battery 200 may be wound or folded and accommodated in a battery case 220. Then, the battery case 220 may be filled with an organic electrolyte and sealed by a sealing member 240, thereby completing the manufacture of the lithium secondary battery 200. The battery case 220 may be a cylindrical type, a rectangular type, or a thin-film type. For example, the lithium secondary battery 200 may be a large thin-film type battery. For example, the lithium secondary battery 200 may be a lithium ion battery.

The separator 213 may be between the positive electrode 214 and the negative electrode 212 to provide a battery assembly. The battery assembly may be stacked in a bi-cell structure and impregnated with an electrolyte solution, and put into a pouch and hermetically sealed, thereby completing the manufacture of a lithium ion polymer secondary battery.

Alternatively, a plurality of battery assemblies may be stacked upon one another to form a battery pack, which may be used in a device that operates at high temperatures and requires high power. For example, the battery pack may be used in a laptop computer, a smart phone, a power tool, or an electric vehicle.

The lithium secondary battery 200 may have improved storage-stability at a high temperature, high-rate characteristics, and lifespan characteristics, and thus may be applied to an electric vehicle (EV). For example, the lithium secondary battery 200 may be applied to a hybrid vehicle, such as a plug-in hybrid electric vehicle (PHEV).

The following are descriptions of definitions of substituents used in formulae set forth herein.

The term "alkyl" group as used herein refers to a group derived from a completely saturated, branched or unbranched (or a straight or linear) hydrocarbon.

Non-limiting examples of the alkyl group may include methyl, ethyl, n-propyl, isopropyl, n-butyl, isobutyl, sec-butyl, t-butyl, iso-pentyl, neo-pentyl, iso-amyl, n-hexyl, 3-methylhexyl, 2,2-dimethylpentyl, 2,3-dimethylpentyl, and n-heptyl.

At least one hydrogen atom of the "alkyl" group may be substituted with a halogen atom, a $C_1$-$C_{20}$ alkyl group substituted with halogen (e.g., —$CH_2CF_3$, —$CH_2CHF_2$, —$CH_2F$, and —$CCl_3$), a $C_1$-$C_{20}$ alkoxy group, a $C_2$-$C_{20}$ alkoxyalkyl group, a hydroxyl group, a nitro group, a cyano group, an amino group, a $C_1$-$C_{20}$ alkyl group, a $C_2$-$C_{20}$ alkenyl group, a $C_2$-$C_{20}$ alkynyl group, a $C_1$-$C_{20}$ heteroalkyl group, a $C_6$-$C_{20}$ aryl group, a $C_6$-$C_{20}$ arylalkyl group, a $C_6$-$C_{20}$ heteroaryl group, a $C_7$-$C_{20}$ heteroarylalkyl group, a $C_6$-$C_{20}$ heteroaryloxy group, or a $C_6$-$C_{20}$ heteroaryloxyalkyl group.

The term "halogen" as used herein refers to fluorine, bromine, chlorine, or iodine.

The term "$C_1$-$C_{20}$ alkyl group substituted with halogen" as used herein refers to a $C_1$-$C_{20}$ alkyl group substituted with at least one halogen group. Non-limiting examples thereof may include a monohaloalkyl group, a dihaloalkyl group, and a polyhaloalkyl group including a perhaloalkyl group. The monohaloalkyl group may refer to an alkyl group including iodine, bromine, chlorine, or fluorine. The dihaloalkyl group and the polyhaloalkyl group refer to an alkyl group having two or more halogen atoms that are the same or different from each other.

The term "alkoxy" group as used herein may be represented by alkyl-O—, wherein the term "alkyl" has the same meaning as described above. Non-limiting examples of the alkoxy group may include methoxy, ethoxy, propoxy, 2-propoxy, butoxy, tert-butoxy, pentyloxy, hexyloxy, cyclopropoxy, and cyclohexyloxy. At least one hydrogen atom of the alkoxy group may be substituted with the same substituents as used in the alkyl group described above.

The term "alkoxyalkyl" group as used herein refers to an alkyl group substituted with the alkoxy group. At least one hydrogen atom of the alkoxyalkyl group may be substituted with the same substituents as used in the alkyl group. Likewise, the term "alkoxyalkyl" as used herein refers to a substituted alkoxyalkyl moiety.

The term "alkenyl" group as used herein refers to a group derived from a branched or unbranched hydrocarbon with at least one carbon-carbon double bond. Non-limiting examples of the alkenyl group may include vinyl, aryl, butenyl, isopropenyl, and isobutenyl. At least one hydrogen atom of the alkenyl group may be substituted with the same substituents as used in the alkyl group described above.

The term "alkynyl" group as used herein refers to a group derived from a branched or unbranched hydrocarbon with at least one carbon-carbon triple bond. Non-limiting examples of the alkynyl group include ethynyl, butynyl, iso-butynyl, and iso-propynyl. At least one hydrogen atom of the alkynyl group may be substituted with the same substituents as used in the alkyl group described above.

The term "alkylene oxide" as used herein may be represented by alkylene-O. Non-limiting examples of the alkylene group may include methylene, ethylene, propylene, and butylene. At least one hydrogen atom of the "alkylene" group may be substituted with the same substituents as used in the alkyl group described above.

The term "cycloalkyl" group as used herein refers to an alkyl forming a ring. Alkyl is as described above. Non-limiting examples of the cycloalkyl group may include cyclopropyl, cyclobutyl, cyclopentyl, and cyclohexyl. At least one hydrogen atom of the cycloalkyl group may be substituted with a substituent as used in the alkyl group described above.

The term "aryl" group as used herein, which is used alone or in combination, refers to an aromatic hydrocarbon containing at least one ring. The term "aryl" group as used herein is construed as including a group with an aromatic ring fused to at least one cycloalkyl ring. Non-limiting examples of the aryl group are phenyl, naphthyl, and tetrahydronaphthyl. At least one hydrogen atom of the "aryl" group may be substituted with the same substituents as used in the alkyl group described above.

The term "arylalkyl" group as used herein refers to an alkyl group substituted with an aryl group. Examples of the arylalkyl group may include benzyl and phenyl-$CH_2CH_2$—.

The term "aryloxy" group as used herein may be represented by —O-aryl. An example thereof may be phenoxy. At least one hydrogen atom of the "aryloxy" group may be substituted with the same substituents as used in the alkyl group described above.

The term "heteroaryl" group" refers to a monocyclic or bicyclic organic compound including at least one heteroatom selected from nitrogen (N), oxygen (O), phosphorous (P), and sulfur (S), wherein the rest of the cyclic atoms are all carbon atoms. The heteroaryl group may include, e.g., one to five heteroatoms. In some embodiments, the heteroaryl group may include a five- to ten-membered ring. In the heteroaryl group, S or N may be present in various oxidized forms.

At least one hydrogen atom of the "heteroaryl" group may be substituted with the same substituents as used in the alkyl group described above.

The term "heteroarylalkyl" group as used herein refers to an alkyl group substituted with a heteroaryl group.

The term "heteroaryloxy" group as used herein refers to a —O-heteroaryl moiety. At least one hydrogen atom of the "heteroaryl" group may be substituted with the same substituents as used in the alkyl group described above.

The term "heteroaryloxyalkyl" group as used herein refers to an alkyl group substituted with a heteroaryl group. At least one hydrogen atom of the heteroaryloxy group may be substituted with the same substituents as used in the alkyl group described above.

The term "amino" group as used herein refers to a group containing a nitrogen atom that is covalently bound to at least one carbon or heteroatom. Examples of the amino group include —$NH_2$ and a substituted moiety. In addition, the amino group may include "alkylamino" in which a nitrogen atom is bound to at least one additional alkyl group, "arylamino" in which a nitrogen atom is bound to at least one aryl group, and "diarylamino" in which a nitrogen atom is bound to at least two aryl groups, wherein the aryl group is independently selected.

"Cycloalkyl" means a monovalent group having one or more saturated rings in which all ring members are carbon (e.g., cyclopentyl and cyclohexyl).

The term "alkylene oxide" refers to a compound having the formula

wherein $R_1$ is hydrogen or a $C_1$-$C_{12}$ alkyl group.

When a group containing a specified number of carbon atoms is substituted with any of the groups listed in the preceding paragraph(s), the number of carbon atoms in the resulting "substituted" group is defined as the sum of the carbon atoms contained in the original (unsubstituted) group and the carbon atoms (if any) contained in the substituent. For example, when the term "substituted C1-C10 alkyl" refers to a C1-C10 alkyl group substituted with a C6-C30 aryl group, the total number of carbon atoms in the resulting aryl substituted alkyl group is C7-C40.

Hereinafter Examples and Comparative Examples will be described in detail. However, Examples are for illustrative purpose only, and shall not limit the scope of this disclosure.

EXAMPLES

Example 1

Preparation of Electrolyte

Ethylene carbonate, ethyl methyl carbonate, and dimethyl carbonate were mixed in a volume ratio of about 2:4:4 to a form non-aqueous organic solvent, then, 0.2 weight percent (weight %) of Compound 1 (3-hydroxy-2-quinoxaline carboxylic acid, available from Sigma Aldrich) was added thereto, and then, 1.15 molar (M) $LiPF_6$ was added thereto as a lithium salt to thereby prepare an electrolyte.

Compound 1

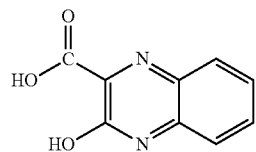

Example 2

Preparation of Electrolyte

An electrolyte was prepared in the same manner as in Example 1, except that 0.2 weight % of Compound 2 (2-(trifluoromethyl)quinoxaline, available from Sigma Aldrich) was used instead of 0.2 weight % of Compound 1 (3-hydroxy-2-quinoxaline carboxylic acid, available from Sigma Aldrich).

Compound 2

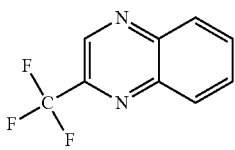

2

Example 3

Preparation of Electrolyte

An electrolyte was prepared in the same manner as in Example 1, except that 0.2 weight % of Compound 3 (2-(quinoxaline) carboxylic acid, available from Sigma Aldrich) was used instead of 0.2 weight % of Compound 1 (3-hydroxy-2-quinoxaline carboxylic acid, available from Sigma Aldrich).

Compound 3

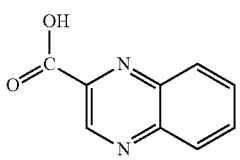

3

Example 4

Preparation of Electrolyte

An electrolyte was prepared in the same manner as in Example 1, except that 0.2 weight % of Compound 4 (2-(tribromomethyl)quinoxaline, available from Sigma Aldrich) was used instead of 0.2 weight % of Compound 1 (3-hydroxy-2-quinoxaline carboxylic acid, available from Sigma Aldrich).

Compound 4

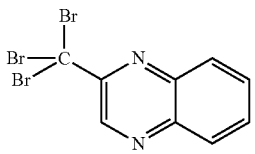

4

Comparative Example 1

Preparation of Electrolyte

Ethylene carbonate, ethyl methyl carbonate, and dimethyl carbonate were mixed at a volume ratio of about 2:4:4 to a form non-aqueous organic solvent, and then 1.15 M $LiPF_6$ was added thereto as a lithium salt to thereby prepare an electrolyte.

Comparative Example 2

Preparation of Electrolyte

Ethylene carbonate, ethyl methyl carbonate, and dimethyl carbonate were mixed at a volume ratio of about 2:4:4 to a form non-aqueous organic solvent, then, 0.2 weight % of Compound 5 (quinoxaline, available from Sigma Aldrich) was added thereto, and then, 1.15 M $LiPF_6$ was added thereto as a lithium salt to thereby prepare an electrolyte.

Compound 5

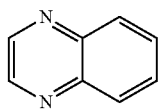

5

Example 5

Preparation of Lithium Secondary Battery (Full-Cell)

(Preparation of Positive Electrode)

To $LiNi_{0.9}Co_{0.09}Al_{0.01}O_2$ positive active material powder, a pyrrolidone solution including a conductive agent (Denka black) and a PVDF binder was added such that the weight ratio of the powder to the conductive agent to the PVDF binder was 97:1.4:1.6 and then mixed, thereby preparing a positive active material slurry.

The positive active material slurry was coated at a thickness of 70 μm using a 3-roll coater on an aluminum foil having a thickness of 15 μm, and then dried. Additional drying was performed under vacuum at a temperature of 110° C. to prepare a positive electrode plate. The positive electrode plate was pressed using a roll press to prepare a positive electrode.

(Preparation of Negative Electrode)

Graphite powder (purity: 99.99%, available from Sigma Aldrich) was added with styrene-butadiene-rubber (SBR) and carboxymethyl cellulose (CMC) in order for the weight ratio of the graphite powder to SBR to CMC to be 97:1.5:1.5, and then homogeneously mixed using a PD mixer (available from KM Tech) to thereby prepare a negative active material slurry.

The negative active material slurry was coated at a thickness in a range of about 50 μm to about 60 μm using a 3-roll coater on a copper foil having a thickness of 10 μm, and then dried. Additional drying was performed under vacuum at a temperature of 120° C. to prepare a negative electrode plate. The negative electrode plate was pressed using a roll press to prepare a negative electrode.

(Preparation of Lithium Secondary Battery (Full-Cell))

The positive electrode, the negative electrode, the electrolyte prepared in Example 1, and the polyethylene separator were used to prepare a 18650 mini full-cell.

Examples 6 to 8

Preparation of Lithium Secondary Battery (Full-Cell)

18650 mini full-cells were prepared in the same manner as in Example 5, except that the electrolyte prepared in Examples 2 to 4, respectively, were used instead of the electrolyte prepared in Example 1.

Comparative Examples 3 and 4

Preparation of Lithium Secondary Battery (Full-Cell)

18650 mini full-cells were prepared in the same manner as in Example 5, except that the electrolyte prepared in Comparative Examples 1 to 2, respectively, were used instead of the electrolyte prepared in Example 1.

Analysis Example 1

Scanning Electron Microscope (SEM) Image Analysis-Analysis of Surface of Negative Electrode and Positive Electrode The surfaces of the negative electrode and the positive electrode of the lithium secondary batteries (full-cells) prepared in Example 6 and Comparative Examples 3 and 4 were observed using SEM (available from Hitachi, S-5500) at a magnification of 35,000 times. The analysis results are shown in FIGS. 4A to 4C and FIG. 4D to 4F.

Figure 4A:
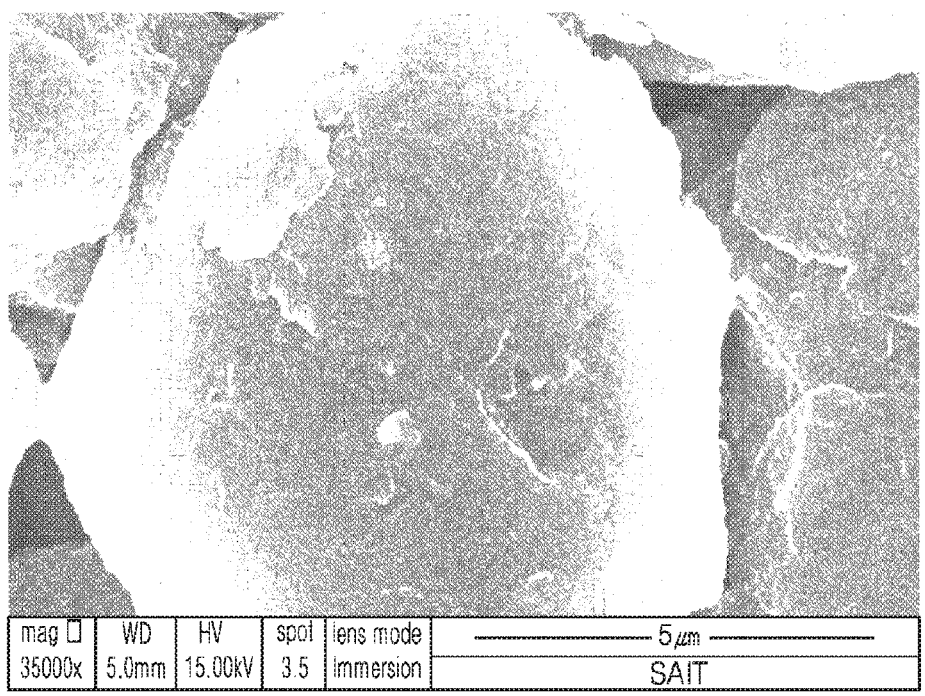
FIGS. 4A to 4C are each a scanning electron microscope (SEM) image of a surface of a negative electrode of lithium secondary batteries prepared in Example 6 and Comparative Examples 3 and 4, respectively.
Figure 4B:
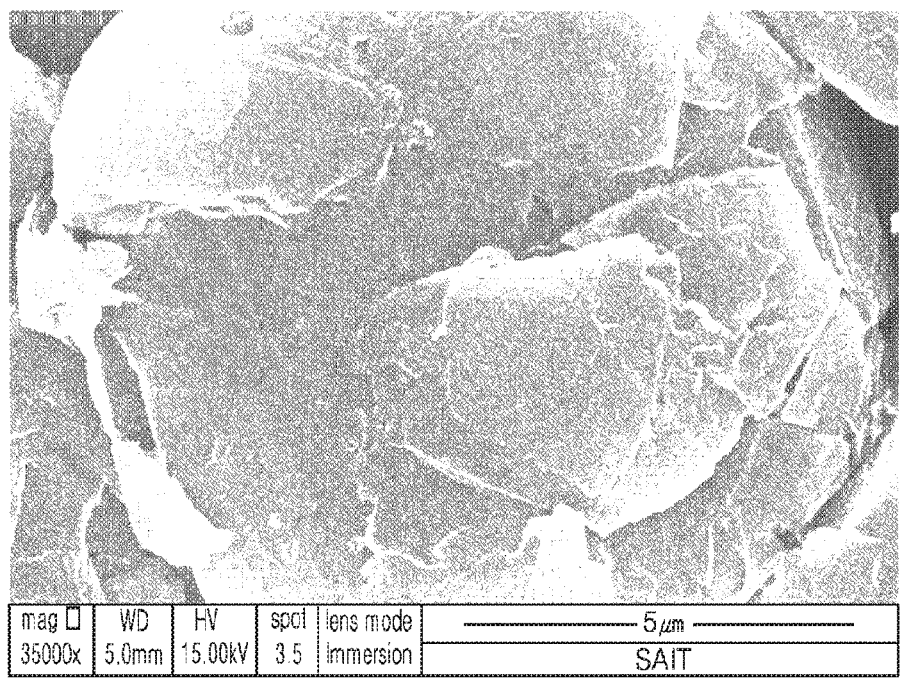
Figure 4C:
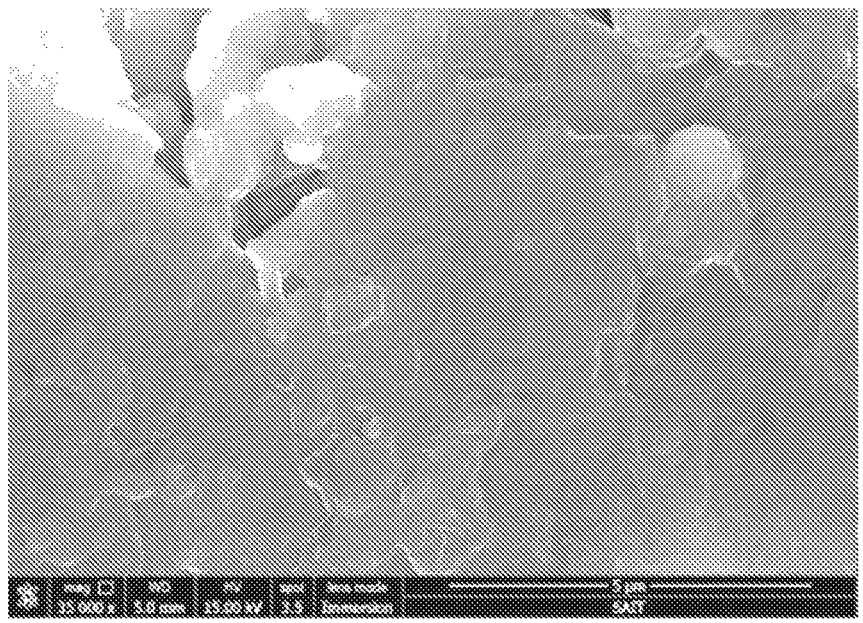
Figure 4D:
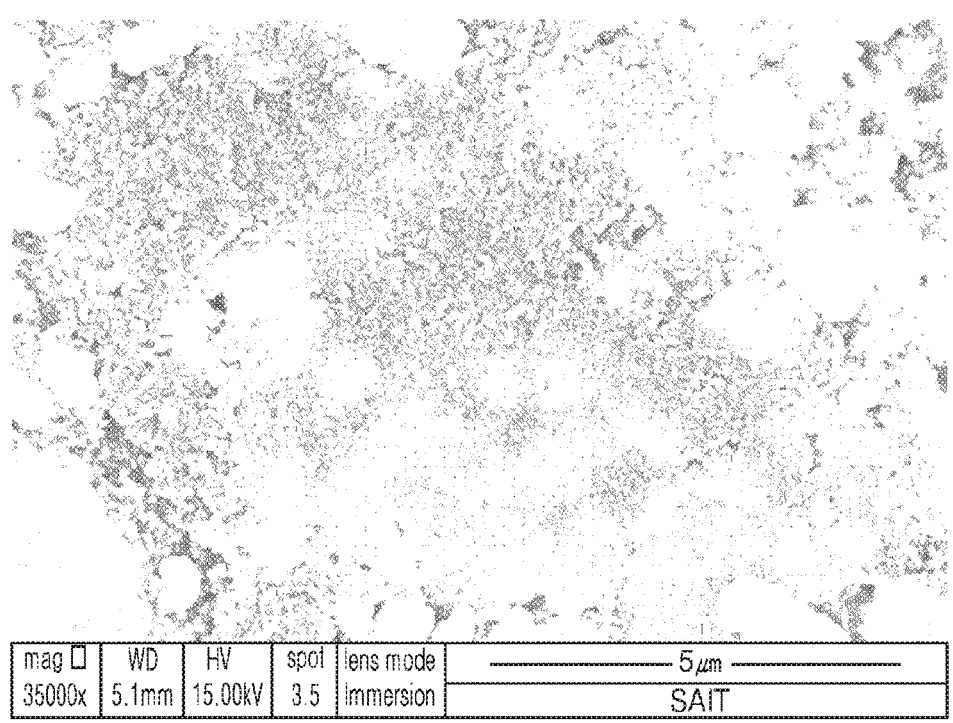
FIGS. 4D to 4F are each a SEM image of a surface of a positive electrode of lithium secondary battery prepared in Example 6 and Comparative Examples 3 and 4, respectively.
Figure 4E:
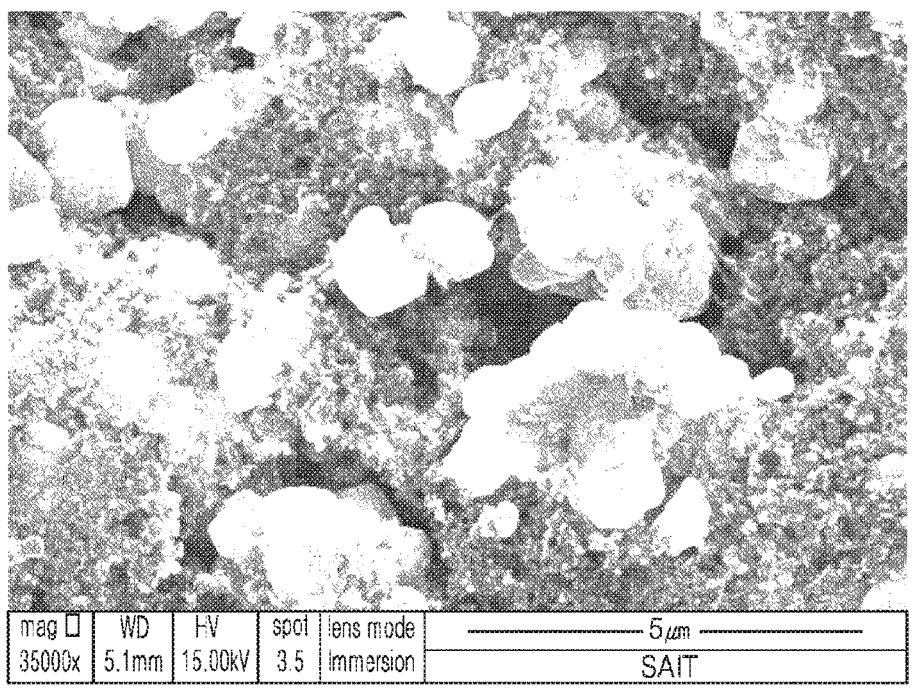
Figure 4F:
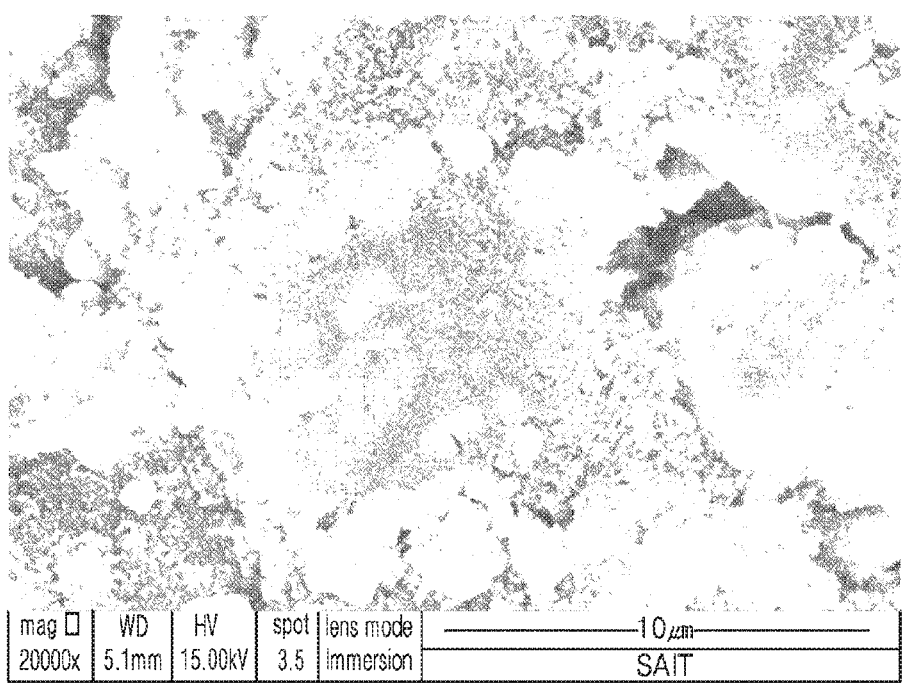

FIG. 4A and FIG. 4D are each a SEM image of a surface of the negative electrode and the positive electrode, respectively, of the lithium secondary battery prepared in Example 6. FIGS. 4B and 4E are each a SEM image of a surface of the negative electrode and the positive electrode, respectively, of the lithium secondary battery prepared in Comparative Example 3. FIGS. 4C and 4F are each a SEM image of a surface of the negative electrode and the positive electrode, respectively, of the lithium secondary battery prepared in Comparative Example 4.

Referring to FIGS. 4A to 4C, it was found that SEI layers were formed on each of the surfaces of the negative electrodes of the lithium secondary batteries prepared in Example 6 and Comparative Examples 3 and 4, respectively. It was found that the SEI layer formed on the surface of the negative electrode of the lithium secondary battery prepared in Example 6 was thin and homogeneous compared to the SEI layers formed on the surface of the negative electrodes of the lithium secondary batteries prepared in Comparative Examples 3 and 4.

Referring to FIGS. 4D to 4F, it was found that coating films were formed on each of the surfaces of the positive electrodes of the lithium secondary batteries prepared in Example 6 and Comparative Examples 3 and 4, respectively. It was found that the coating film formed on the surface of the positive electrode of the lithium secondary battery prepared in Example 6 was thin and homogeneous, whereas the coating films formed on the surface of the positive electrodes of the lithium secondary batteries prepared in Comparative Examples 3 and 4 were incomplete and fractured.

Analysis Example 2

Figure 5:
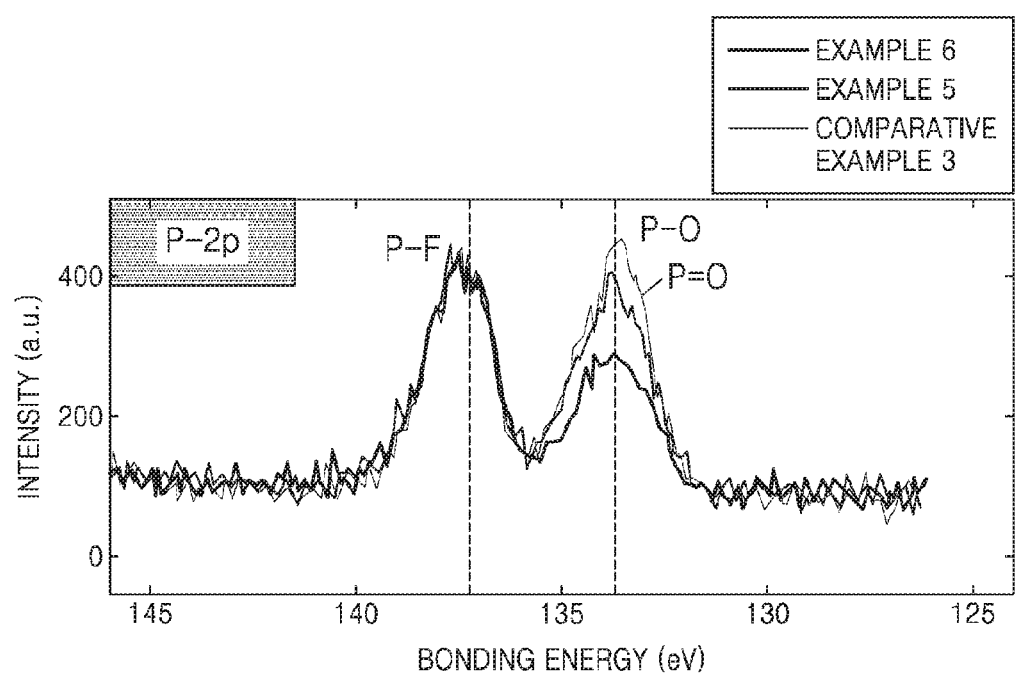
FIG. 5 is a graph of intensity (arbitrary units, a.u.) versus binding energy (electron volts, eV) and shows the results of X-ray photoelectron spectroscopy (XPS) analysis of surfaces of negative electrodes of lithium secondary batteries prepared in Examples 5 and 6 and Comparative Example 3.

X-Ray Photoelectron Spectroscopy (XPS) Analysis-Surface of Negative Electrode Analysis XPS was performed on each of the surfaces of the negative electrodes of the lithium secondary batteries (full-cells) prepared in Examples 5 and 6 and Comparative Example 3. The results of P2p spectrum is shown in FIG. 5.

XPS analysis was performed using Quantum 2000 (available from Physical Electronics. Inc.) (an acceleration voltage of about 0.5 keV to about 15 keV, 300 W, an energy resolution of about 1.0 eV, a minimum analyzing area of about 10 micro, and a sputter rate of about 0.1 nm/min).

As for the condition of XPS analysis, the lithium secondary batteries prepared in Examples 5 and 6 and Comparative Example 3 were charged with a constant current of about 0.2 C until the voltage reached 4.35 V, and then, at a voltage of 4.35 V, the lithium secondary batteries were charged with a constant voltage until the current reached 0.05 C. Then, the lithium secondary batteries were discharged with a constant current of about 0.2 C until the voltage reached 2.8 V (formation process). The C rate is a discharge rate of a cell, and is obtained by dividing a total capacity of the cell by a total discharge period of time, e.g., a C rate for a battery having a discharge capacity of 1.6 ampere-hours would be 1.6 amperes.

The lithium secondary batteries that underwent the formation process were charged at 1.0 C as described above at room temperature (25° C.), and then, discharged at 1.0 C until the voltage reached 2.8 V. The reference charging and discharging condition was the charging and discharging condition, and the discharging capacity was used as a reference capacity. Then, this cycle of charging and discharging was repeated 300 times. The lithium secondary batteries were disassembled, and XPS was then performed on the surfaces of the negative electrodes thereof.

Referring to FIG. 5, a peak corresponding to P—O or P═O was found to decrease from Comparative Example 3 to Example 5 and Example 6.

Since the lithium secondary batteries prepared in Examples 5 and 6 included solid SEI layers on each of the surface of the negative electrode of the lithium secondary batteries, decomposition of the electrolyte was relatively less than the lithium secondary battery prepared in Comparative Example 3.

Analysis Example 3

Inductively Coupled Plasma (ICP) Analysis-Surface of Positive Electrode Analysis ICP analysis was performed on each of the surfaces of the positive electrodes of the lithium secondary batteries (full-cells) prepared in Examples 5 and 6 and Comparative Example 3. The surface composition analysis results are shown in Table 1.

ICP analysis was performed using ICP-AES (ICPS-8100, available from Shimadzu, RF source: 27.12 MHz, and a sample uptake rate: 0.8 ml/min).

As for the condition of ICP analysis, as performed in XPS analysis in Analysis Example 2, two times of formation process were performed, and the same charging and discharging were repeated 300th times. The lithium secondary batteries were disassembled, and ICP was then performed on the surfaces of the positive electrodes thereof.

TABLE 1

| Classification | Amount of eluted Ni on a surface of a positive electrode (ppm or mg/L) |
|---|---|
| Example 5 | 3.8 |
| Example 6 | 13 |
| Comparative Example 3 | 15 |

Referring to Table 1, the amount of eluted Ni on the surfaces of the positive electrodes of the lithium secondary batteries prepared in Examples 5 and 6 were found to be reduced compared with that of the surface of the positive electrode of the lithium secondary battery prepared in Comparative Example 3. Particularly, the amount of eluted Ni on the surface of the positive electrode of the lithium secondary battery prepared in Example 5 was found to be much reduced compared with that of the surface of the positive electrode of the lithium secondary battery prepared in Comparative Example 3.

Evaluation Example 1

Alternating-Current Impedance (ACI) Evaluation

ACI evaluation was performed on each of the lithium secondary batteries (full-cells) prepared in Example 5 and Comparative Examples 3 and 4. The ACI evaluation results are shown in FIG. 6 and Table 2.

As for the condition of ACI evaluation, as performed in XPS analysis in Analysis Example 2, two times of formation process were performed, and the same charging and discharging were repeated 300th times. Then, at a state of SOC 50%, the lithium secondary batteries were scanned in a range of about $10^{-1}$ hertz (Hz) to about $10^5$ Hz to measure ACI of the lithium secondary batteries. The amplitude of the alternating current was 10 millivolts (mV). Provided that the total charge capacity of a battery is 100%, SOC 50% means a state when the battery is charged to 50% of the charge capacity.

Figure 6:
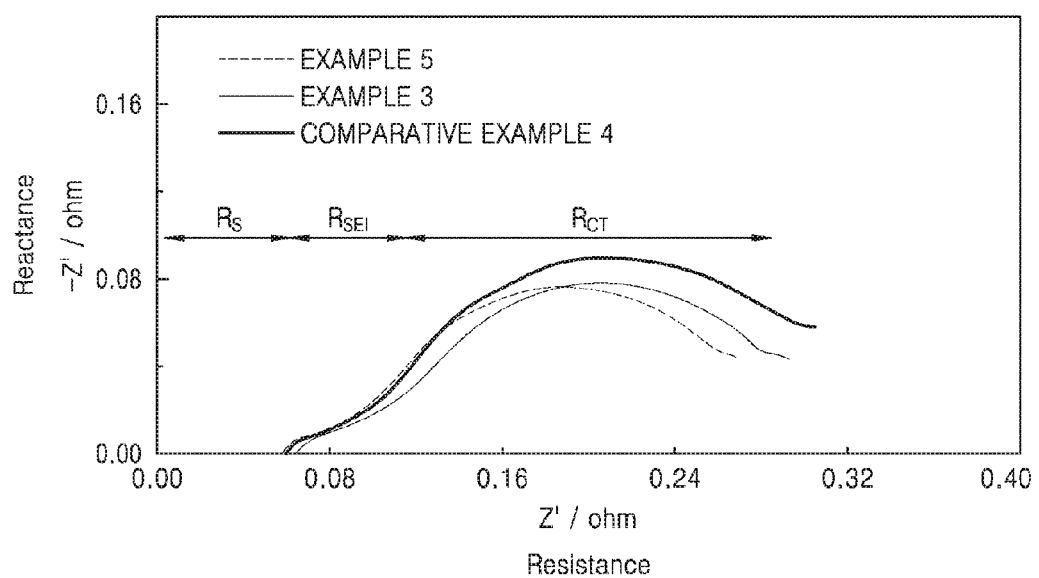
FIG. 6 is a graph of reactance (Z', ohms) versus resistance (Z", ohms) and shows the results of alternating-current impedance (ACI) evaluation of lithium secondary batteries prepared in Example 5 and Comparative Examples 3 and 4.

In the graph of FIG. 6, the x-axis resistance value (Rs) starting from the origin to the start of the plot indicates the bulk resistance value due to a film, the x-axis resistance value ($R_{SEI}$) corresponding to the diameter of the half circle in the forepart of the plot indicates the SEI resistance value formed on the surface of the negative electrode substrate, and the x-axis resistance value ($R_{CT}$) corresponding to the diameter of the half circle in the later part of the plot indicates the charge transfer resistance value at an interface double layer.

TABLE 2

| Classification | Rs (ohm) | $R_{SEI}$ (ohm) | $R_{CT}$ (ohm) |
|---|---|---|---|
| Example 5 | 0.056 | 0.045 | 0.189 |
| Example 6 | 0.056 | 0.043 | 0.241 |
| Comparative Example 3 | 0.063 | 0.052 | 0.200 |
| Comparative Example 4 | 0.059 | 0.045 | 0.231 |

Referring to FIG. 6 and Table 2, $R_{SEI}$ values of the lithium secondary batteries prepared in Examples 5 and 6 were found to be low compared to that of the lithium secondary battery prepared in Comparative Example 3. This means that the resistance caused by the SEI layer is small. Accordingly, the lithium secondary batteries prepared in Examples 5 and 6 may have suppressed formation of SEI layers due to additional decomposition of the electrolyte.

Further, it was found that the lithium secondary battery prepared in Example 5 had small $R_{CT}$ value compared with the lithium secondary batteries prepared in Comparative Examples 3 and 4.

Evaluation Example 2

Direct-Current Internal Resistance (DCIR) Evaluation

DCIR evaluation was performed on the lithium secondary batteries (full-cells) prepared in Example 5 and Comparative Examples 3 and 4. The evaluation results are shown in Table 3.

DCIR evaluation was performed on the lithium secondary batteries under the same condition as in XPS analysis in Analysis Example 2, two times of formation process were performed, and the same charging and discharging were repeated 300th times. Then, at a state of SOC 50%, DCIR of the lithium secondary batteries were measured at the 100th cycle and the 300th cycle. Provided that the whole charge capacity of a battery is 100%, SOC 50% means a state when the battery is charged to 50% of the charge capacity.

TABLE 3

| Classification | at the 100th cycle DCIR (mΩ) | at the 300th cycle DCIR (mΩ) |
|---|---|---|
| Example 5 | 227 | 303 |
| Comparative Example 3 | 244 | 327 |
| Comparative Example 4 | 241 | 348 |

Referring to Table 3, DCIR values of the lithium secondary battery prepared in Example 5 at the 100th cycle and the 300th cycle were found to be small compared with the lithium secondary batteries prepared in Comparative Examples 3 and 4.

Evaluation Example 3 dQ/dV Evaluation-Reduction Decomposition Voltage Evaluation

The lithium secondary batteries (full-cells) prepared in Examples 5 to 8 and Comparative Examples 3 and 4 (25° C.) were charged with a constant current of about 80 mA until the voltage reached 2.6 V (vs. a lithium metal). A portion of the first charging profile is illustrated as a graph of voltage (V) versus differential capacity (dQ/dV/mAh (gV)$^{-1}$) in FIG. 7

Figure 7:
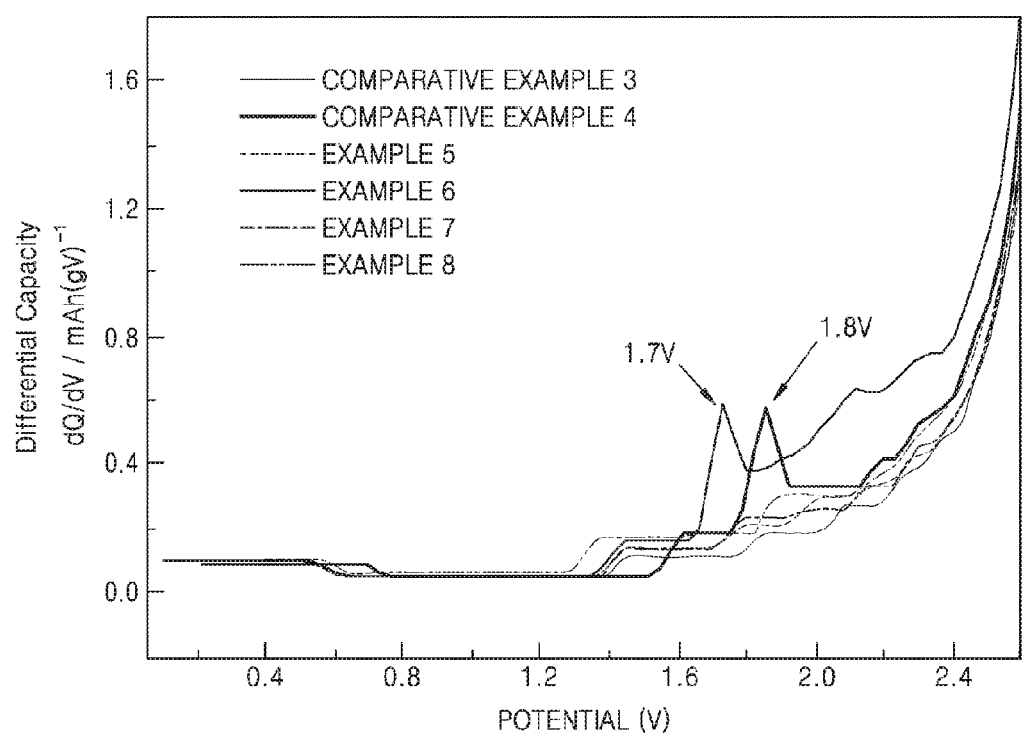
FIG. 7 is a graph of differential capacity (dQ/dV, milli-ampere-hours per gram-volts, mAh(gV)$^{-1}$ versus potential (volts, V) of the first charging dQ/dV profile of lithium secondary batteries prepared in Examples 5 to 8 and Comparative Examples 3 and 4 in an operating range from about 0 V to about 2.6 V vs. Li/Li$^+$.

Referring to FIG. 7, it was found that a dQ/dV peak of the lithium secondary battery prepared in Example 6 was high compared with that of the lithium secondary battery prepared in Comparative Example 4. It means that the reduction potential of the lithium secondary battery prepared in Example 6 was high compared with that of the lithium secondary battery prepared in Comparative Example 4.

With regard to the lithium secondary batteries (full-cells) prepared in Examples 5 to 8 and Comparative Example 4, a reduction potential thereof were calculated using a polarizable continuum model (PCM) and density functional theory (B3LYP) by Gaussian 09 code and a 6-311+G(d, p) basis for calculation. The results thereof are shown in Table 4.

TABLE 4

| Classification | Reduction potential ($E_{rd}$, V) |
|---|---|
| Example 5 | 2.05 |
| Example 6 | 1.74 |
| Example 7 | 1.86 |
| Example 8 | 3.28 |
| Comparative Example 4 | 1.37 |

Referring to FIG. 4, it was found that reduction potential ($E_{rd}$) of the lithium secondary batteries prepared in Examples 5 to 8 was high compared with that of the lithium secondary battery prepared in Comparative Example 4.

The result in Table 4 corresponds to the dQ/dV result shown in FIG. 7. In addition, the lithium secondary batteries prepared in Examples 5, 7, and 8 that did not show dQ/dV peaks in FIG. 7 may each have had a very high reduction potential, and already reacted while assembling the battery.

Evaluation Example 4

Charging and Discharging Evaluation-Lifespan Characteristics

The lithium secondary batteries (full-cells) prepared in Examples 5 to 8 and Comparative Examples 3 and 4 were charged with a constant current of about 0.2 C until the voltage reached 4.35 V, and then, at a voltage of 4.35 V, the lithium secondary batteries were charged with a constant voltage until the current reached 0.05 C. Then, the lithium secondary batteries were discharged with a constant current of about 0.2 C until the voltage reached 2.8 V (formation process).

Figure 8A:
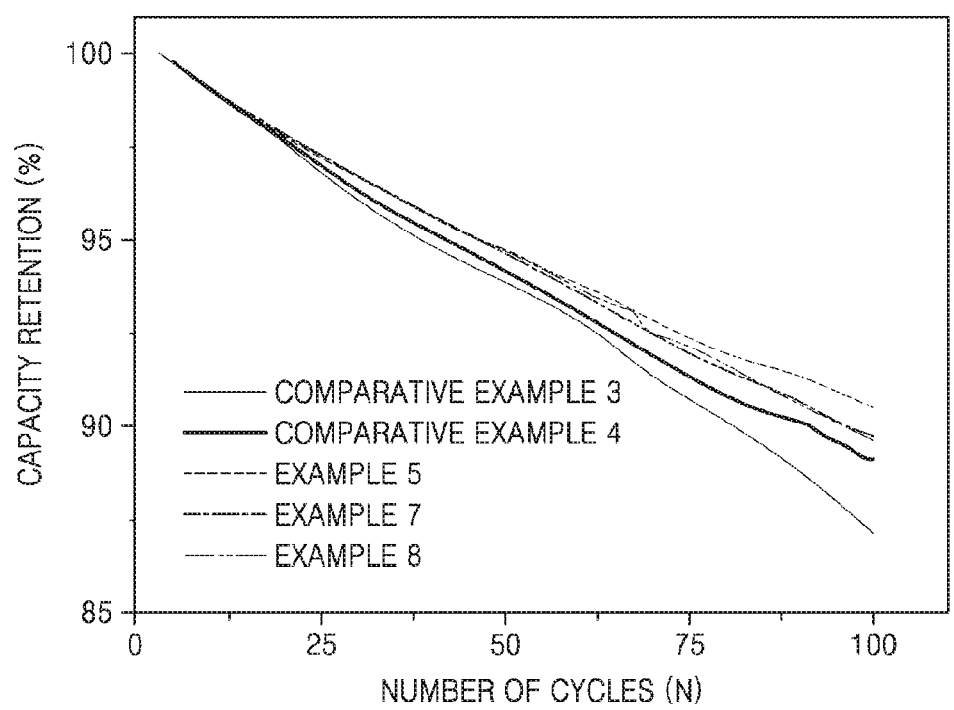
FIG. 8A is a graph of capacity retention (percent, %) versus the number of cycles (N) of the lithium secondary batteries prepared in Examples 5, 8, and 9 and Comparative Examples 3 and 4, up to the 100$^{th}$ cycle.
Figure 8B:
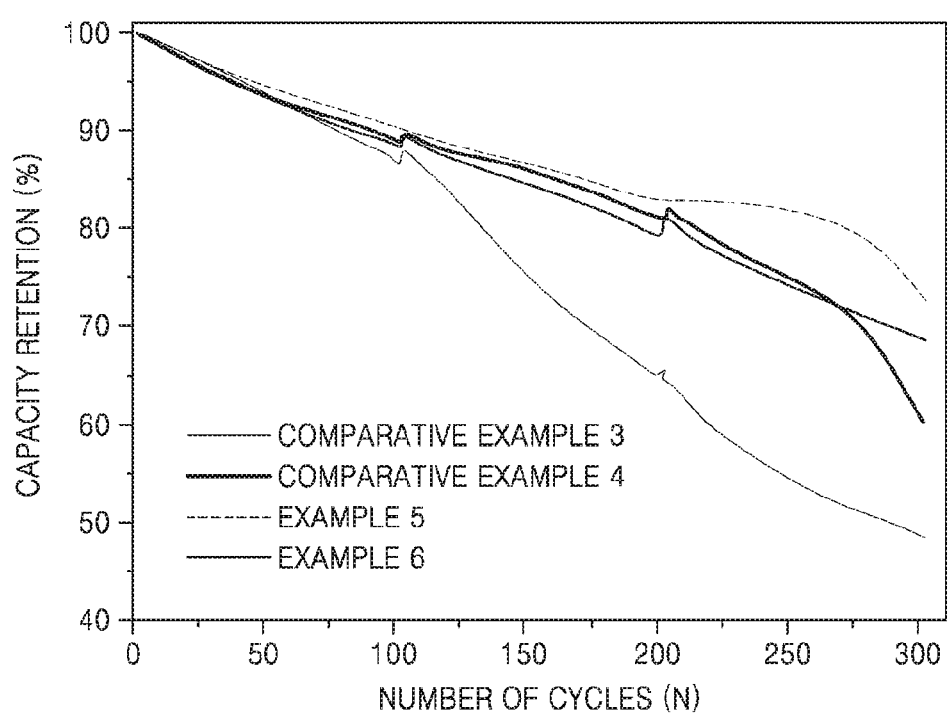
FIG. 8B is a graph of capacity retention (percent, %) versus the number of cycles (N) of the lithium secondary batteries prepared in Examples 5, 8, and 9 and Comparative Examples 3 and 4, up to the 300$^{th}$ cycle.

The lithium secondary batteries that underwent the formation process were charged at 1.0 C as described above at room temperature (25° C.), and then, discharged at 1.0 C until the voltage reached 2.8 V. The reference charging and discharging condition was the charging and discharging condition, and the discharging capacity was used as a reference capacity. Thereafter, this cycle of charging and discharging was repeated up to the $100^{th}$ cycle (short-term lifespan characteristics) and the $300^{th}$ cycle (long-term lifespan characteristics). Short-term lifespan characteristics and long-term lifespan characteristics were calculated using Equations 1 and 2, and evaluated. The evaluation results are shown in FIGS. 8A and 8B and Tables 5 and 6.

Short-term lifespan characteristics (capacity retention rate at the $100^{th}$ cycle [%])=[$100^{th}$ cycle discharge capacity/$1^{st}$ cycle discharge capacity]× 100%   Equation 1

Long-term lifespan characteristics (capacity retention rate at the $300_{th}$ cycle [%])=[300th cycle discharge capacity/1st cycle discharge capacity]× 100%   Equation 2

TABLE 5

| Classification | Short-term lifespan characteristics (Capacity retention rate at $100_{th}$ cycle [%]) |
|---|---|
| Example 5 | 90.1 |
| Example 8 | 89.2 |
| Example 9 | 89.2 |
| Comparative Example 3 | 86.5 |
| Comparative Example 4 | 88.9 |

TABLE 6

| Classification | Long-term lifespan characteristics (Capacity retention rate at $300_{th}$ cycle [%]) |
|---|---|
| Example 5 | 72.4 |
| Example 6 | 68.6 |
| Comparative Example 3 | 48.5 |
| Comparative Example 4 | 60.1 |

Referring to FIG. 8A and Table 5, short-term lifespan characteristics of the lithium secondary batteries prepared in Examples 5, 8, and 9 were found to improve compared with those of the lithium secondary batteries prepared in Comparative Examples 3 and 4.

Referring to FIG. 8B and Table 6, long-term lifespan characteristics of the lithium secondary batteries prepared in Examples 5 and 6 were found to improve compared with those of the lithium secondary batteries prepared in Comparative Examples 3 and 4.

As described above, according to one or more exemplary embodiments, an electrolyte for a secondary battery may include a heterocyclic compound represented by Formula 1, and thus the secondary battery including the electrolyte may have improved capacity and lifespan characteristics.

It should be understood that exemplary embodiments described herein should be considered in a descriptive sense only and not for purposes of limitation. Descriptions of features or aspects within each exemplary embodiment should be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. An electrolyte for a secondary battery comprising:
a non-aqueous solvent;
a lithium salt; and
a heterocyclic compound represented by Formula 1:

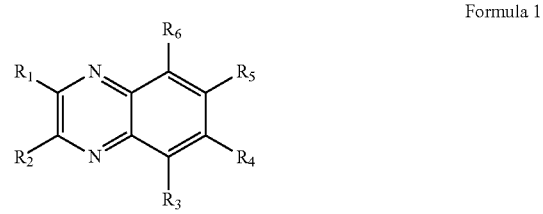

Formula 1 wherein, in Formula 1,
$R_1$ and $R_2$ are each independently selected from hydrogen, a halogen group, a cyano group, a hydroxy group, a nitro group, —C(=O)R$_a$, —C(=O)OR$_a$, —OCO(OR$_a$), —C=N(R$_a$), a substituted or unsubstituted C$_1$-C$_{20}$ alkyl group, and a combination thereof, wherein R$_a$ is selected from hydrogen and a C$_1$-C$_{10}$ alkyl group, and R$_3$, R$_4$, R$_5$, and R$_6$ are each independently selected from hydrogen, a halogen group, a cyano group, a hydroxy group, —C(=O)R$_b$, —C(=O)OR$_b$, —OCO(OR$_b$), —C=N(R$_b$), —SR$_b$, —S(=O)R$_b$, —S(=O)$_2$R$_b$, —P(R$_b$)$_2$, a substituted or unsubstituted C$_1$-C$_{20}$ alkyl group, a substituted or unsubstituted C$_1$-C$_{20}$ alkoxy group, a substituted or unsubstituted C$_2$-C$_{20}$ alkenyl group, a substituted or unsubstituted C$_2$-C$_{20}$ alkynyl group, a C$_2$-C$_{20}$ alkylene oxide group, a substituted or unsubstituted C$_3$-C$_{30}$ cycloalkyl group, a substituted or unsubstituted C$_6$-C$_{30}$ aryl group, a substituted or unsubstituted C$_6$-C$_{30}$ aryloxy group, a substituted or unsubstituted C$_6$-C$_{30}$ heteroaryl group, and a combination thereof, wherein R$_b$ is selected from hydrogen, a C$_1$-C$_{10}$ alkyl group, and a C$_6$-C$_{20}$ aryl group, provided that at least one selected from R$_1$ and R$_2$ is selected from a cyano group, a hydroxy group, a nitro group, —C(=O)R$_a$, —C(=O)OR$_a$, a substituted C$_1$-C$_{20}$ alkyl group, and a combination thereof.

2. The electrolyte of claim 1, wherein the heterocyclic compound is represented by Formula 2:

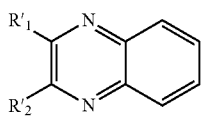

Formula 2 wherein, in Formula 2,

R'$_1$ and R'$_2$ are each independently selected from hydrogen, a cyano group, a hydroxy group, a nitro group, —C(=O)R$_c$, —C(=O)OR$_c$, —OCO(OR$_c$), —C=N(R$_c$), a substituted C$_1$-C$_{20}$ alkyl group, and a combination thereof, wherein R$_c$ is selected from hydrogen and a C$_1$-C$_{10}$ alkyl group, provided that R'$_1$ and R'$_2$ are not both hydrogen.

3. The electrolyte of claim 2, wherein, in Formula 2,

R'$_1$ is selected from a cyano group, a hydroxy group, a nitro group, —C(=O)R$_c$, —C(=O)OR$_c$, a substituted C$_1$-C$_{20}$ alkyl group, and a combination thereof, and R'$_2$ is selected from hydrogen, a cyano group, a hydroxy group, a nitro group, —C(=O)R$_c$, —C(=O)OR$_c$, a substituted C$_1$-C$_{20}$ alkyl group, and a combination thereof.

4. The electrolyte of claim 1, wherein the heterocyclic compound comprises a compound selected from Compounds 1 to 4:

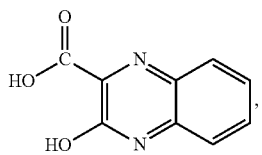

1

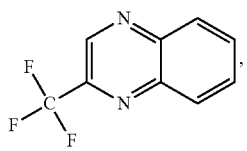

2

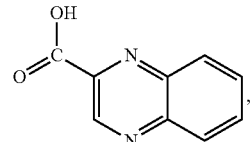

3

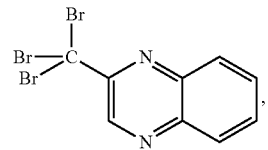

4 and a combination thereof.

5. The electrolyte of claim 1, wherein an amount of the heterocyclic compound is in a range of about 0.005 weight percent to about 10 weight percent, based on a total weight of the electrolyte.

6. The electrolyte of claim 1, wherein an amount of the heterocyclic compound is in a range of about 0.05 weight percent to about 2 weight percent, based on a total weight of the electrolyte.

7. The electrolyte of claim 1, wherein the lithium salt comprises a salt selected from LiSCN, LiN(CN)$_2$, LiClO$_4$, LiAlO$_4$, LiAlCl$_4$, LiBF$_4$, LiAsF$_6$, LiPF$_6$, LiCF$_3$SO$_3$, Li(CF$_3$SO$_2$)$_2$N, LiC$_4$F$_9$SO$_3$, Li(CF$_3$SO$_2$)$_3$C, LiN(SO$_2$F)$_2$, LiN(SO$_2$CF$_3$)$_2$, LiN(SO$_2$CF$_2$CF$_3$)$_2$, LiSbF$_6$, LiPF$_3$(CF$_2$CF$_3$)$_3$, LiPF$_3$(CF$_3$)$_3$, LiB(C$_2$O$_4$)$_2$, and a combination thereof.

8. The electrolyte of claim 1, wherein the non-aqueous organic solvent comprises a solvent selected from ethylene carbonate, propylene carbonate, dimethyl carbonate, diethyl carbonate, ethyl methyl carbonate, fluoroethylene carbonate, fluoropropylene carbonate, difluoropropylene carbonate, trifluoropropylene glycol ester, γ-butyrolactone, chloro-γ-butyrolactone, dichloro-γ-butyrolactone, bromopropylene carbonate, dibromopropylene carbonate, tribromopropylene glycol ester, bromo-γ-butyrolactone, dibromo-γ-butyrolactone, nitropropylene carbonate, nitro-γ-butyrolactone, cyanopropylene carbonate, cyano-γ-butyrolactone, 1,2-dimethoxy ethane, diepoxy ethane, dimethylene glycol dimethyl ether, trimethylene glycol dimethyl ether, tetraethylene glycol dimethyl ether, polyethylene glycol dimethyl ether, succinonitrile, sulfolane, dimethyl sulfone, ethyl methyl sulfone, diethyl sulfone, adiponitrile, 1,1,2,2-tetrafluoroethyl 2,2,3,3-tetrafluoropropyl ether, tetraphenylethene, 2,2,2-trifluoroethanol, and a combination thereof.

9. A secondary battery comprising:
a positive electrode including a positive active material;
a negative electrode including a negative active material; and
an electrolyte between the positive electrode and the negative electrode,
wherein the electrolyte comprises a non-aqueous organic solvent, a lithium salt, and a heterocyclic compound represented by Formula 1,

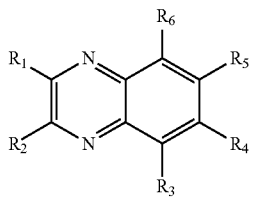

Formula 1 wherein, in Formula 1,

R₁ and R₂ are each independently selected from hydrogen, a halogen group, a cyano group, a hydroxy group, a nitro group, —C(=O)R$_a$, —C(=O)OR$_a$, —OCO(OR$_a$), —C=N(R$_a$), a substituted or unsubstituted C$_1$-C$_{20}$ alkyl group, and a combination thereof, wherein R$_a$ is selected from hydrogen and a C$_1$-C$_{10}$ alkyl group, and R₃, R₄, R₅, and R₆ are each independently selected from hydrogen, a halogen group, a cyano group, a hydroxy group, —C(=O)R$_b$, —C(=O)OR$_b$, —OCO(OR$_b$), —C=N(R$_b$), —SR$_b$, —S(=O)R$_b$, —S(=O)$_2$R$_b$, —P(R$_b$)$_2$, a substituted or unsubstituted C$_1$-C$_{20}$ alkyl group, a substituted or unsubstituted C$_1$-C$_{20}$ alkoxy group, a substituted or unsubstituted C$_2$-C$_{20}$ alkenyl group, a substituted or unsubstituted C$_2$-C$_{20}$ alkynyl group, a C$_2$-C$_{20}$ alkylene oxide group, a substituted or unsubstituted C$_3$-C$_{30}$ cycloalkyl group, a substituted or unsubstituted C$_6$-C$_{30}$ aryl group, a substituted or unsubstituted C$_6$-C$_{30}$ aryloxy group, a substituted or unsubstituted C$_6$-C$_{30}$ heteroaryl group, and a combination thereof, wherein R$_b$ is selected from hydrogen, a C$_1$-C$_{10}$ alkyl group, and a C$_6$-C$_{20}$ aryl group, provided that at least one selected from R₁ and R₂ is selected from a cyano group, a hydroxy group, a nitro group, —C(=O)R$_a$, —C(=O)OR$_a$, a substituted, and a combination thereof.

10. The secondary battery of claim 9, wherein the heterocyclic compound is represented by Formula 2:

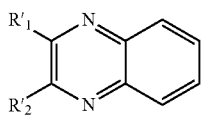

Formula 2 wherein, in Formula 2,

R'₁ and R'₂ are each independently selected from hydrogen, a cyano group, a hydroxy group, a nitro group, —C(=O)R$_c$, —C(=O)OR$_c$, —OCO(OR$_c$), —C=N(R$_c$), a substituted C$_1$-C$_{20}$ alkyl group, and a combination thereof, wherein R$_c$ is selected from hydrogen and a C$_1$-C$_{10}$ alkyl group, provided that R'₁ and R'₂ are not both hydrogen.

11. The secondary battery of claim 10, wherein, in Formula 2,

R'₁ is selected from a cyano group, a hydroxy group, a nitro group, —C(=O)R$_c$, —C(=O)OR$_c$, a substituted C$_1$-C$_{20}$ alkyl group, and a combination thereof, and R'₂ is selected from hydrogen, a cyano group, a hydroxy group, a nitro group, —C(=O)R$_c$, —C(=O)OR$_c$, a substituted C$_1$-C$_{20}$ alkyl group, and a combination thereof.

12. The secondary battery of claim 9, wherein the heterocyclic compound comprises a compound selected from Compounds 1 to 4:

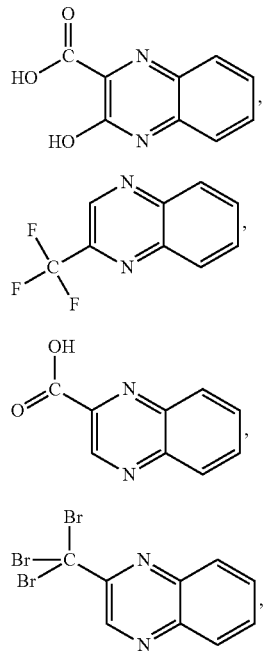

and
a combination thereof.

13. The secondary battery of claim 9, wherein the non-aqueous organic solvent comprises a solvent selected from ethylene carbonate, propylene carbonate, dimethyl carbonate, diethyl carbonate, ethyl methyl carbonate, fluoroethylene carbonate, fluoropropylene carbonate, difluoropropylene carbonate, trifluoropropylene glycol ester, γ-butyrolactone, chloro-γ-butyrolactone, dichloro-γ-butyrolactone, bromopropylene carbonate, dibromopropylene carbonate, tribromopropylene glycol ester, bromo-γ-butyrolactone, dibromo-γ-butyrolactone, nitropropylene carbonate, nitro-γ-butyrolactone, cyanopropylene carbonate, cyano-γ-butyrolactone, 1,2-dimethoxy ethane, diepoxy ethane, dimethylene glycol dimethyl ether, trimethylene glycol dimethyl ether, tetraethylene glycol dimethyl ether, polyethylene glycol dimethyl ether, succinonitrile, sulfolane, dimethyl sulfone, ethyl methyl sulfone, diethyl sulfone, adiponitrile, 1,1,2,2-tetrafluoroethyl 2,2,3,3-tetrafluoropropyl ether, tetraphenylethene 2,2,2-trifluoro ethanol, and a combination thereof.

14. The secondary battery of claim 9, wherein the electrolyte further comprises a lithium salt.

15. The secondary battery of claim 14, wherein the lithium salt comprises a salt selected from LiSCN, LiN(CN)$_2$, LiClO$_4$, LiAlO$_4$, LiAlCl$_4$, LiBF$_4$, LiAsF$_6$, LiPF$_6$, LiCF$_3$SO$_3$, Li(CF$_3$SO$_2$)$_2$N, LiC$_4$F$_9$SO$_3$, Li(CF$_3$SO$_2$)$_3$C, LiN(SO$_2$F)$_2$, LiN(SO$_2$CF$_3$)$_2$, LiN(SO$_2$CF$_2$CF$_3$)$_2$, LiSbF$_6$, LiPF$_3$(CF$_2$CF$_3$)$_3$, LiPF$_3$(CF$_3$)$_3$, LiB(C$_2$O$_4$)$_2$, and a combination thereof.

16. The secondary battery of claim 9, wherein the negative electrode further comprises a solid electrolyte interface layer on a surface of the negative electrode, and wherein the solid electrolyte interface layer comprises a reaction product of the heterocyclic compound.

17. The secondary battery of claim 9, wherein the positive electrode further comprises a coating film on a surface of the positive electrode, wherein the coating film comprises a compound selected from the heterocyclic compound, a reaction product of the heterocyclic compound in the electrolyte, and a combination thereof.

18. The secondary battery of claim 9, wherein an amount of the heterocyclic compound is in a range of about 0.005 weight percent to about 10 weight percent, based on a total weight of the electrolyte.

19. The secondary battery of claim 9, wherein the positive active material comprises a compound selected from $LiCoO_2$, $LiNi_{1-x}Co_xO_2$ wherein $0 \leq x < 1$, $LiNi_xCo_yAl_zO_v$ wherein $0 < x < 1$, $0 < y < 1$, $0 < z < 1$, and $2 \leq v \leq 4$, $Li_{1-x}M_xO_2$ wherein M comprises a transition metal selected from Mn, Fe, and a combination thereof and $0.03 < x < 0.1$, $Li[Ni_xCo_{1-2x}Mn_x]O_2$ wherein $0 < x < 0.5$, $Li[Ni_xMn_y]O_z$ wherein $0 < x < 1$, $0 < y < 2$, and $2 \leq z \leq 4$, $Li_{1+x}(Ni_aCo_bMn_c)_{1-y}O_z$ wherein $0 < x \leq 1$, $0 \leq y < 1$, $2 \leq z \leq 4$, $0 < a < 1$, $0 < b < 1$, $0 < c < 1$, $LiM_2O_4$ wherein M comprises a transition metal selected from Ti, V, Mn, and a combination thereof, $LiM_xMn_{2-x}O_4$ wherein M is a transition metal and $0 \leq x < 2$, $LiFePO_4$, $LiMPO_4$ wherein M comprises a transition metal selected from Mn, Co, Ni, and a combination thereof, $V_2O_5$, $V_2O_3$, $VO_2(B)$, $V_6O_{13}$, $V_4O_9$, $V_3O_7$, $Ag_2V_4O_{11}$, $AgVO_3$, $LiV_3O_5$, $\delta$-$Mn_yV_2O_5$, $\delta$-$NH_4V_4O_{10}$, $Mn_{0.8}V_7O_{16}$, $LiV_3O_8$, $Cu_xV_2O_5$, $Cr_xV_6O_{13}$, $M_2(XO_4)_3$ wherein M is a transition metal and X comprises an element selected from sulfur, phosphorus, arsenic, molybdenum, tungsten, and a combination thereof, and $Li_3M_2(PO_4)_3$ wherein M comprises a transition metal selected from iron, vanadium, and titanium.

20. The secondary battery of claim 9, wherein the negative active material comprises a compound selected from vanadium oxide, lithium vanadium oxide, silicon, $SiO_x$ wherein $0 < x < 2$, an Si—Y' alloy wherein Y' is selected from magnesium, calcium, strontium, barium, radium, scandium, yttrium, titanium, zirconium, hafnium, rutherfordium, vanadium, niobium, tantalum, dubnium, chromium, molybdenum, tungsten, seaborgium, technetium, rhenium, bohrium, iron, lead, ruthenium, osmium, hassium, rhodium, iridium, palladium, platinum, copper, silver, gold, zinc, cadmium, boron, aluminum, gallium, tin, indium, germanium, phosphorus, arsenic, antimony, bismuth, sulfur, selenium, tellurium, polonium, and a combination thereof, graphite, a soft carbon, a hard carbon, a mesophase pitch carbide, a sintered cork, and a combination thereof.

21. The secondary battery of claim 9, wherein the secondary battery is a lithium ion secondary battery.

22. A method of preparing an electrolyte for a secondary battery, the method comprising:
providing a non-aqueous organic solvent;
providing a lithium salt; and
combining the non-aqueous organic solvent and the lithium salt with a heterocyclic compound represented by Formula 1:

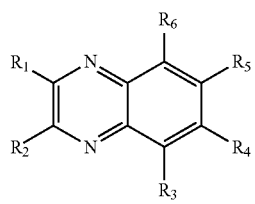

Formula 1 wherein, in Formula 1,
$R_1$ and $R_2$ are each independently selected from hydrogen, a halogen group, a cyano group, a hydroxy group, a nitro group, —C(=O)$R_a$, —C(=O)O$R_a$, —OCO(O$R_a$), —C=N($R_a$), a substituted or unsubstituted $C_1$-$C_{20}$ alkyl group, and a combination thereof, wherein $R_a$ is selected from hydrogen and a $C_1$-$C_{10}$ alkyl group, and $R_3$, $R_4$, $R_5$, and $R_6$ are each independently selected from hydrogen, a halogen group, a cyano group, a hydroxy group, —C(=O)$R_b$, —C(=O)O$R_b$, —OCO(O$R_b$), —C=N($R_b$), —S$R_b$, —S(=O)$R_b$, —S(=O)$_2R_b$, —P($R_b$)$_2$, a substituted or unsubstituted $C_1$-$C_{20}$ alkyl group, a substituted or unsubstituted $C_1$-$C_{20}$ alkoxy group, a substituted or unsubstituted $C_2$-$C_{20}$ alkenyl group, a substituted or unsubstituted $C_2$-$C_{20}$ alkynyl group, a $C_2$-$C_{20}$ alkylene oxide group, a substituted or unsubstituted $C_3$-$C_{30}$ cycloalkyl group, a substituted or unsubstituted $C_6$-$C_{30}$ aryl group, a substituted or unsubstituted $C_6$-$C_{30}$ aryloxy group, a substituted or unsubstituted $C_6$-$C_{30}$ heteroaryl group, and a combination thereof, wherein $R_b$ is selected from hydrogen, a $C_1$-$C_{10}$ alkyl group, and a $C_6$-$C_{20}$ aryl group, provided that at least one selected from $R_1$ and $R_2$ is selected from a cyano group, a hydroxy group, a nitro group, —C(=O)$R_a$, —C(=O)O$R_a$, a substituted $C_1$-$C_{20}$ alkyl group, and a combination thereof, to preparing the electrolyte.

23. A method of manufacturing a secondary battery, the method comprising:
providing a positive electrode including a positive active material and a negative electrode including a negative active material; and
contacting the positive electrode and the negative electrode with the electrolyte of claim 1.

24. A secondary battery comprising:
a positive electrode including a positive active material;
a negative electrode including a negative active material; and
an electrolyte between the positive electrode and the negative electrode,
wherein the electrolyte comprises a non-aqueous organic solvent, a lithium salt, and a heterocyclic compound represented by Formula 1,

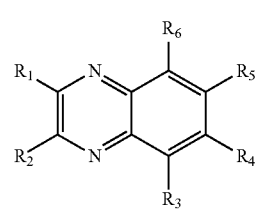

Formula 1 wherein, in Formula 1,
$R_1$ and $R_2$ are each independently selected from hydrogen, a halogen group, a cyano group, a hydroxy group, a nitro group, —C(=O)$R_a$, —C(=O)0$R_a$, —OCO(O$R_a$), —C=N($R_a$), a substituted or unsubstituted $C_1$-$C_{20}$ alkyl group, and a combination thereof, wherein $R_a$ is selected from hydrogen and a $C_1$-$C_{10}$ alkyl group, and $R_3$, $R_4$, $R_5$, and $R_6$ are each independently selected from hydrogen, a halogen group, a cyano group, a hydroxy group, —C(=O)$R_b$, —C(=O)O$R_b$, —OCO(O$R_b$), —C=N($R_b$), —S$R_b$, —S(=O)$R_b$, —S(=O)$_2R_b$, —P($R_b$)$_2$, a substituted or unsubstituted $C_1$-$C_{20}$ alkyl group, a substituted or unsubstituted $C_1$-$C_{20}$ alkoxy group, a substituted or unsubstituted $C_2$-$C_{20}$ alkenyl group, a substituted or unsubstituted $C_2$-$C_{20}$ alkynyl group, a $C_2$-$C_{20}$ alkylene oxide group, a substituted or unsubstituted $C_3$-$C_{30}$ cycloalkyl group, a substituted or unsubstituted $C_6$-$C_{30}$ aryl group, a substituted or unsubstituted $C_6$-$C_{30}$ aryloxy group, a substituted or unsubstituted $C_6$-$C_{30}$ heteroaryl group, and a combination thereof, wherein $R_b$ is selected from hydrogen, a $C_1$-$C_{10}$ alkyl group, and a $C_6$-$C_{20}$ aryl group, provided that at least one selected from $R_1$ and $R_2$ is selected from a halogen group, a cyano group, a hydroxy group, a nitro group, —C(=O)$R_a$, —C(=O)O$R_a$, a substituted or unsubstituted $C_1$-$C_{20}$ alkyl group, and a combination thereof, and wherein the negative electrode further comprises a solid electrolyte interface layer on a surface of the negative electrode, and the solid electrolyte interface layer comprises a reaction product of the heterocyclic compound, or wherein the positive electrode further comprises a coating film on a surface of the positive electrode and the coating film comprises a compound selected from the heterocyclic compound, a reaction product of the heterocyclic compound in the electrolyte, and a combination thereof.

* * * * *